US006964178B2

(12) United States Patent
Aikawa et al.

(10) Patent No.: US 6,964,178 B2
(45) Date of Patent: Nov. 15, 2005

(54) AIR CONDITIONING SYSTEM FOR VEHICLE

(75) Inventors: Yasukazu Aikawa, Nagoya (JP); Etsuhisa Yamada, Kariya (JP); Atsushi Inaba, Kariya (JP); Shigeru Hisanaga, Kariya (JP); Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/063,013

(22) Filed: Feb. 22, 2005

(65) Prior Publication Data
US 2005/0188717 A1    Sep. 1, 2005

(30) Foreign Application Priority Data

Feb. 27, 2004  (JP) .............................. 2004-054667
Jan. 11, 2005  (JP) .............................. 2005-004450

(51) Int. Cl.$^7$ ............................................. F25D 17/02
(52) U.S. Cl. ........................................ 62/434; 62/500
(58) Field of Search ............................. 62/239, 196.3, 62/244, 434, 498, 500, 530

(56) References Cited

U.S. PATENT DOCUMENTS

| 4,007,776 A | * | 2/1977 | Alkasab ..................... 165/236 |
| 4,748,828 A | * | 6/1988 | Chang ......................... 62/290 |
| 6,701,731 B2 | | 3/2004 | Aikawa et al. |

FOREIGN PATENT DOCUMENTS

| JP | 2000-313226 | 11/2000 |
| JP | 2002-022295 | 1/2002 |

* cited by examiner

Primary Examiner—Melvin Jones
(74) Attorney, Agent, or Firm—Harness, Dickey & Pierce, PLC

(57) ABSTRACT

An air conditioning system for a vehicle has a cool storage heat exchanger for continuing cooling operation with stored cooling energy during a compressor is stopped due to a temporal stop of an engine for the vehicle. Cooling energy is stored in the cool storage material of the cool storage heat exchanger during a normal cooling operation during which the compressor is operated by the engine. When the vehicle stops, for example before a traffic lamp, and thereby the compressor is not operated, an ejector is operated to circulate the refrigerant from the cool storage heat exchanger to an evaporator so that the cooling operation can be continued.

12 Claims, 10 Drawing Sheets

AIR CONDITIONING SYSTEM FOR VEHICLE

CROSS REFERENCE TO RELATED APPLICATION

This application is based on Japanese Patent Application Nos. 2004-54667 filed on Feb. 27, 2004 and 2005-004450 filed on Jan. 11, 2005, the disclosures of which are incorporated herein by reference.

FIELD OF THE INVENTION

This invention relates to an air conditioning system for a vehicle, and more particularly to an air conditioning system for a motor vehicle, in which an internal combustion engine for driving a compressor as well as the vehicle is temporarily stopped when a certain condition is met, for example at a vehicle stop.

BACKGROUND OF THE INVENTION

In recent years, such a vehicle as an economical-running vehicle, for example a hybrid car, in which an operation of an internal combustion engine is temporarily stopped at a vehicle stop in case of waiting for a change of a traffic lamp, is realized, in view of an environment protection, an improvement of a fuel consumption ratio and so on. And a demand for such vehicles is increasing.

In an air conditioning system for a vehicle, a compressor for a refrigerating cycle is operated by an internal combustion engine for the vehicle. As a result, the operation of the compressor is likewise temporarily stopped whenever the operation of the engine is stopped in case of waiting for a change of a traffic lamp. Then, a temperature at a cooling evaporator will be increased, and thereby a temperature of air to be blown into a vehicle passenger room will be increased. Accordingly, a feeling of a cooling operation for the passenger would become worse.

A demand for an air conditioning system of a cool storage type has been therefore increased, wherein the air conditioning system comprises a cool storage means for storing cooling energy during an operation of an engine (and a compressor) and a cooling operation is continued with the stored cooling energy during the operation of the engine and the compressor is stopped.

The air conditioning system of this kind is known in the art, for example as disclosed in Japanese Patent Publication No. 2000-313226. FIG. 22 is a schematic view showing the air conditioning system corresponding to that shown in the above Japanese Patent Publication. In a refrigerating cycle shown in FIG. 22, a compressor 1 is driven by an engine of a vehicle, and a cool storage heat exchanger 40 containing therein cool storage material 40a is connected in parallel with an evaporator 8.

An electromagnetic valve 41 is opened during the engine and the compressor 1 are operated, so that low pressure refrigerant depressurized by an expansion valve 7 flows in parallel into the evaporator 8 and the cool storage heat exchanger 40, to cool down the cool storage material 40a and store the cooling energy in the cool storage material 40a. When the engine is stopped and thereby the compressor stops its operation, an electrically driven pump 42 is operated to circulate the refrigerant in a closed cycle comprising a liquid storing tank 43, the electromagnetic valve 41, the electrically driven pump 42, the cool storage heat exchanger 40 and the evaporator 8.

The gas-phase refrigerant evaporated in the evaporator 8 is condensed by the cooling energy of the cool storage material 40a, and the condensed liquid-phase refrigerant is supplied to the evaporator 8, so that a cooling operation by the air conditioning system can be continued even during the compressor operation is stopped.

The electrically driven pump 42 sucks the liquid-phase refrigerant from the liquid storing tank 43, shortly after the engine operation is stopped, namely shortly after the cooling operation by the cooling energy of the cool storage heat exchanger 40 has started. Since the electrically driven pump 42 is filled with the liquid-phase refrigerant at the starting period of the pump, a lost motion of the electrically driven pump 42 can be avoided.

According to another prior art, as disclosed in Japanese Patent Publication No. 2004-51077 (which has been filed by the same applicant to the present invention), a cool storage heat exchanger 11, a liquid storing tank 10, an electrically driven pump 42 and a check valve 18 are connected as shown in FIGS. 23 and 24, and those components are arranged in a single tank designated by a two-dot-chain lines in those drawings, so that the air conditioning system can be easily installed in a vehicle.

In the air conditioning systems shown in FIGS. 23 and 24, the cool storage material 11a filled in the cool storage heat exchanger 11 is cooled down by the low pressure and low temperature refrigerant depressurized and expanded by an expansion valve 7 or by an orifice 70 and thereby the cooling energy is stored in the cool storage material 11a. When the engine and the compressor are stopped, the electrically driven pump 42 is operated to supply the cooled down refrigerant from the cool storage heat exchanger 11 to an evaporator 8, so that the cooling operation by the air conditioning system is continued. Reference numerals in FIGS. 23 and 24, which are not explained here, correspond to those elements or components explained below for the embodiments of the present invention.

In the above described prior art, the electrically driven pump, in which a mechanical pump is driven by an electric motor, is used for circulating the refrigerant. And thereby, it has a disadvantage in that a manufacturing cost is increased. Furthermore, there are following disadvantages, in the case that the electrically driven pump would be installed within the liquid refrigerant storing tank to improve an installing process of the air conditioning system into a vehicle:

(1) Since a liquid pump, such as a mechanical pump driven by an electric motor, can not generally pump out gas-phase fluid, the liquid pump must be located in a gas-liquid separating tank in such a manner that the liquid-phase fluid (refrigerant in this case) can be always predominantly supplied to the liquid pump. As a result, the manufacturing cost is increased and an additional space for the gas-liquid separating tank is necessary.

(2) Since the electric motor is used for driving the mechanical pump, the electric wires for supplying electric power to the electric motor are necessary, wherein the electric wires connect the outside electrical power source with the electric motor disposed within the liquid storing tank. As a result, the wires must be electrically insulated from the tank and the tank must be hermetically sealed because of the refrigerant therein. The manufacturing cost is thereby further increased.

(3) The electric motor must be disassembled from the liquid storing tank, in the case that brushes will be replaced by new ones due to the wear. The refrigerant must be removed from the refrigerating cycle for such replacement, and the refrigerant must be filled again into the refrigerating cycle after the replacement is completed. As a result, a maintenance fee is increased.

SUMMARY OF THE INVENTION

The present invention is made in view of the above problems, and it is an object of the present invention to provide an air conditioning system of a cool storage type for a vehicle. The air conditioning system of the present invention is simple in structure and low in manufacturing cost, and further has an improved high durability and reliability by eliminating the mechanical pump driven by the electric motor.

According to a feature of the present invention, as explained hereinafter in connection with a first embodiment of the present invention, a cool storage heat exchanger is provided between a depressurizing means (an expansion valve) and an evaporator, so that refrigerant from a compressor flows through a condenser device, the expansion valve, the cool storage heat exchanger and an evaporator, and back to the compressor, in a normal cooling operation during which the compressor is operated by an engine for a vehicle. In the above normal cooling operation, cool storage material contained in the cool storage heat exchanger is also cooled down by the low pressure and the low temperature refrigerant from the expansion valve, so that cooling energy is stored in the cool storage material.

In the air conditioning system of the present invention, a bypass passage is further provided between an inlet side of the compressor and an upstream side of the cool storage heat exchanger, and a driving flow passage is also provided between an upstream side of the expansion valve and a downstream side of the cool storage heat exchanger (but at an upstream side of the evaporator). And an ejector is furthermore provided in the driving flow passage, so that the high pressure refrigerant from the condenser device flows into the ejector through a high pressure inlet port of the ejector. The ejector has further a suction port connected to the down stream side of the cool storage heat exchanger, so that the ejector sucks refrigerant from the cool storage heat exchanger and ejects the refrigerant to the evaporator by mixing the refrigerant from the condenser device and sucked refrigerant from the cool storage heat exchanger. A control valve is further provided in the driving flow passage, which is controlled by an electronic control unit to open the driving flow passage, when the engine operation (and the compressor operation) is stopped.

According to the above feature of the present invention, the cooling energy stored in the cool storage material is used for the cooling operation during the engine stop, and the refrigerant is circulated by the ejector which operates in accordance with a pressure difference in the refrigerating cycle.

According to another feature of the present invention, as explained hereinafter in connection with a second embodiment of the present invention, an outlet side of the ejector is connected to the upstream side of the cool storage heat exchanger and the suction port of the ejector is connected to an inlet side of the compressor (namely, a downstream side of the evaporator) through a suction flow passage. According to the feature, the normal cooling operation is performed in the same manner to that described above, whereas the refrigerant is circulated from the cool storage heat exchanger, the evaporator and the ejector in the cooling operation during the engine operation is stopped.

According to a further feature of the present invention, as explained hereinafter in connection with a third embodiment of the present invention, the present invention can be applied to an accumulator cycle. In the normal cooling operation, the refrigerant flows from the compressor, the condenser device, a fixed orifice (instead of the expansion valve described in the above feature), the cool storage heat exchanger, the evaporator, and an accumulator, and then back to the compressor. The ejector is connected at its high pressure inlet port with the condenser device through the driving flow passage, at its outlet port to the upstream side of the evaporator, and at its suction port to the accumulator. Accordingly, the liquid-phase refrigerant is sucked into the ejector from the accumulator, and the refrigerant is circulated from the ejector through the evaporator, the cool storage heat exchanger and the accumulator. As a result, the cooling operation with the stored cooling energy can be likewise performed in the accumulator cycle.

According to a still further feature of the present invention, as explained hereinafter in connection with a fourth embodiment of the present invention, the ejector, the evaporator and the cool storage heat exchanger can be connected in series in the accumulator cycle. In such an arrangement, the refrigerant flows from the compressor, the condenser device, a variable orifice (instead of the expansion valve or the fixed orifice), the ejector (the high pressure inlet port and the outlet port), the evaporator, the cool storage heat exchanger, and the accumulator, in the normal cooling operation. The suction port of the ejector is connected to the accumulator, so that the liquid-phase refrigerant is sucked by the ejector from the accumulator and the refrigerant is circulated by the operation of the ejector in a circuit of the ejector, the evaporator, the cool storage heat exchanger and the accumulator in the operation during the compressor operation is stopped.

According to a still further feature of the present invention, as explained hereinafter in connection with a fifth embodiment of the present invention, a refrigerating cycle for the normal cooling operation is composed of the compressor, the condenser device, the variable orifice, the ejector (the high pressure inlet port and the outlet port), the accumulator (the liquid-phase portion), the cool storage heat exchanger, the evaporator, the ejector (the suction port and the outlet port) and the accumulator (the gas-phase portion). And another refrigerating cycle for the operation with the stored cooling energy is composed of the ejector (the suction port and the outlet port), the accumulator (the liquid-phase portion), the cool storage heat exchanger and the evaporator. Even with such an arrangement, the normal cooling operation as well as the cooling operation with the stored cooling energy can be performed in the similar manner to those described in the above features.

According to a still further feature of the present invention, as explained hereinafter in connection with a sixth embodiment of the present invention, a refrigerating cycle for the normal cooling operation can be composed of the compressor, the condenser device, the variable orifice, the ejector (the high pressure inlet port and the outlet port), the evaporator, the accumulator (the gas-phase portion). And another refrigerating cycle for the operation with the stored cooling energy can be composed of the ejector (the suction port and the outlet port), the evaporator, the accumulator (the liquid-phase portion), the cool storage heat exchanger. Even with such an arrangement, the normal cooling operation as well as the cooling operation with the stored cooling energy can be performed in the similar manner to those described in the above features.

According to a still further feature of the present invention, as explained hereinafter in connection with a seventh or an eighth embodiment of the present invention, a refrigerating cycle for the normal cooling operation can be composed of the compressor, the condenser device, the expansion valve, the cool storage heat exchanger, and the evaporator. And another refrigerating cycle for the operation with the stored cooling energy can be composed of the ejector (the suction port and the outlet port), the evaporator, the bypass passage, the cool storage heat exchanger. Even with such an arrangement, the normal cooling operation as well as the cooling operation with the stored cooling energy can be performed in the similar manner to those described in the above features.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figures 1, 2:
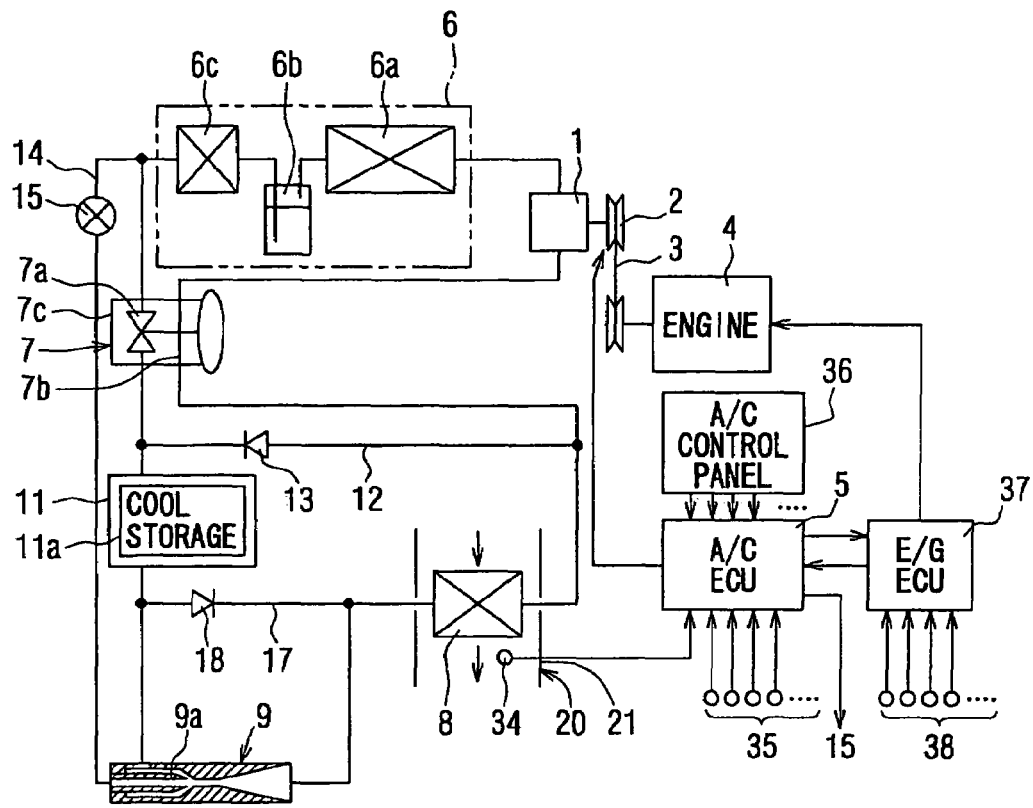
FIG. 1 is a schematic view of an air conditioning system for a vehicle according to a first embodiment of the present invention.
FIG. 2 is a schematic cross-sectional view of an air conditioning unit of the above first embodiment.

The present invention will be explained below with reference to the embodiments. FIG. 1 is a schematic view of an air conditioning system for a vehicle according to a first embodiment of the present invention. The air conditioning system is installed, for example in a hybrid vehicle, in which an internal combustion engine is operated or stopped depending on a running mode of the vehicle, or in such a vehicle having an economical-running function, in which an operation of an internal combustion engine is temporarily stopped at a vehicle stop in case of waiting for a change of a traffic lamp.

A refrigerating cycle for the air conditioning system comprises a compressor 1 for sucking, compressing and discharging a refrigerant, wherein the compressor 1 is equipped with an electromagnetic clutch 2. The compressor 1 is operatively connected with an internal combustion engine 4 via the clutch 2 and a belt 3, so that an operation of the compressor 1 is controlled by the electromagnetic clutch 2 which is controlled by a control unit 5.

A super heated gas-phase refrigerant of a high temperature and a high pressure discharged from the compressor 1 flows into a condenser device 6 (a high pressure side heat exchanger). The refrigerant is cooled down and condensed at the condenser device 6 through heat exchange with ambient air sent by a cooling fan (not shown). The condenser device 6 is a well known device comprising a condensing portion 6a, a gas-liquid separator 6b for separating the refrigerant flowing from the condensing portion 6a into a gas-phase and a liquid-phase refrigerants and storing the liquid-phase refrigerant, and a super cooling portion 6c for super cooling the liquid-phase refrigerant from the separator 6b, wherein those components 6a, 6b and 6c are integrally formed.

The super cooled refrigerant from the super cooling portion 6c is depressurized by an expansion valve 7, operating as a depressurizing means, so that the refrigerant becomes two-phase (gas-phase and liquid-phase) refrigerant of a low pressure. The expansion valve 7 is a thermal type expansion valve, which adjusts an opening of a valve 7a (refrigerant flow ratio) to control a degree of super heat of the refrigerant at an outlet of an evaporator 8. In particular, in this embodiment, a housing 7c of the expansion valve 7 is formed into a box-shape, and a refrigerant passage 7b of an evaporator outlet is formed inside of the housing 7c, and a temperature sensing portion for the refrigerant of the evaporator outlet is integrally formed inside the housing 7c.

The evaporator 8 is a heat exchanger for cooling down the air to be blown into the passenger room of the vehicle, by evaporating the low pressure refrigerant depressurized by the expansion valve 7.

FIG. 2 shows a schematic cross sectional view of an air conditioning unit 20 (A/C unit), which is generally installed in the vehicle behind an instrument panel. A case 21 of the A/C unit 20 forms a passage for the air flowing toward the passenger room and the evaporator 8 is arranged in the case 21.

In the air conditioning system of the present invention, a cool storage heat exchanger 11 is provided at an upstream side of the evaporator 8, wherein the cool storage heat exchanger 11 contains therein a cool storage material 11a which is cooled down by a low pressure refrigerant from the compressor 1 during its operation.

A blower 22, which comprises a centrifugal-type blower fan 22a and a blower motor 22b, is provided in the case 21 at an upstream side of the evaporator 8. A switching box 23 is provided at an inlet side of the blower fan 22a and a switching door 23a opens and closes an outside and an inside air openings. An air mixing door 24 is arranged in the case 21 at a downstream of the evaporator 8 and a heater core 25 is arranged at a downstream of the air mixing door 24. The heater core 25 is a hot water type heat exchanger for heating the air using the hot water (engine cooling water) from the engine 4.

A bypass passage 26 is formed a side portion of the heater core 25, so that the air can bypass the heater core 25 without being heated. The air mixing door 24 is a flat plate door pivoted to the case 21 for controlling a flow ratio of the air flowing through the heater core 25 (hot air) and bypassing the heater core 25 (cool air). The temperature of the air to be blown into the passenger room is thereby controlled by adjusting the flow ratio.

An air mixing chamber 27 is formed at a downstream of the heater core 25 and the bypass passage 26, for mixing the hot air from the heater core 25 and cool air from the bypass passage 26 to form the air having a desired temperature. A blowing mode switching portion is formed at the downstream of the air mixing chamber 27. The switching portion comprises a defroster opening 28 for blowing the air toward a front windshield of the vehicle, a face opening 29 for blowing the air toward an upper body of a passenger in the passenger room, and a foot opening 30 for blowing the air toward feet of the passenger. The switching portion further comprises blowing air control doors 31, 32 and 33 respectively provided at the openings 28, 29 and 30, so that each of the openings 28, 29 and 30 are opened or closed in accordance with air blowing modes.

A temperature sensor 34 is arranged in the case 21 at the downstream side of and close to the evaporator 8, for detecting a temperature Te (evaporator blowing temperature) of the air passing through the evaporator 8. The evaporator blowing temperature Te is used, as in a similar manner to a generally known air conditioning apparatus, for controlling an ON-OFF operation of the electromagnetic clutch 2 for the compressor 1, or for controlling a displacement of a discharge amount in case of a variable capacitor type compressor. Namely, the evaporator blowing temperature is controlled by adjusting a cooling capacity of the evaporator 8 via the control of the compressor.

As shown in FIG. 1, detected signals from multiple sensors 35 for detecting an inside room temperature Tr, an ambient temperature Tam, an amount TS of solar radiation, a water temperature Tw of the engine cooling water and so on, are inputted into an A/C control unit 5, in addition to the signal from the temperature sensor 34 for the evaporator blowing temperature Te. Further, various signals from operation switches of an A/C control panel 36, which is arranged at a position close to the instrument panel, are also inputted into the A/C control unit 5. Although not shown in the drawing, the operation switches of the A/C control panel 36 include those switches manually operated by the passenger, such as a temperature setting switch, a blowing amount changing switch, a change-over switch for the blowing modes, a change-over switch for the inside or outside air, an A/C switch for starting the operation of the compressor 1, and so on.

The A/C control unit 5 is connected to an engine control unit 37, from which the A/C control unit 5 receives the information for a rotational speed of the engine 4, a vehicle speed and so on. The engine control unit 37 is a well known control unit, which controls a fuel injection amount, an ignition timing and so on based on the information from multiple sensors 38 for detecting the operational condition of the engine 4. In the economical running vehicle, in which the air conditioning system is installed, when the engine control unit 37 or any other electronic control unit detects a vehicle stop based on the signals for the rotational speed of the engine, the vehicle speed, braking operation and so on, the engine control unit 37 stops the operation of the engine 4 by cutting off the electric power supply to an ignition device or cutting off the fuel injection.

When the engine operation is stopped and thereafter a vehicle condition is changed from its stop condition to a running condition by a driving operation of a vehicle driver, the engine control unit 37 recognizes the above vehicle operation change based on the signals from an acceleration pedal and so on, and automatically re-starts the operation of the engine 4.

Even during the engine operation is temporarily stopped, the cooling operation of the air conditioning system can be continued for a certain period based on the cool storage energy at the cool storage heat exchanger 11. However, when such cooling operation is continued for a long period, the cooling operation using the cool storage can not be continued any longer. Then the evaporator blowing temperature Te becomes higher than a target temperature. In this case, the A/C control unit 5 outputs an engine operation start signal to the engine control unit 37, so that the engine control unit 37 operates to re-start the engine operation. The A/C control unit 5 and the engine control unit 37 comprise microcomputers having CPU, ROM, RAM and other associated circuits, as is known in the art. The A/C control unit 5 and the engine control unit 37 can be formed into one control unit.

Figure 3:
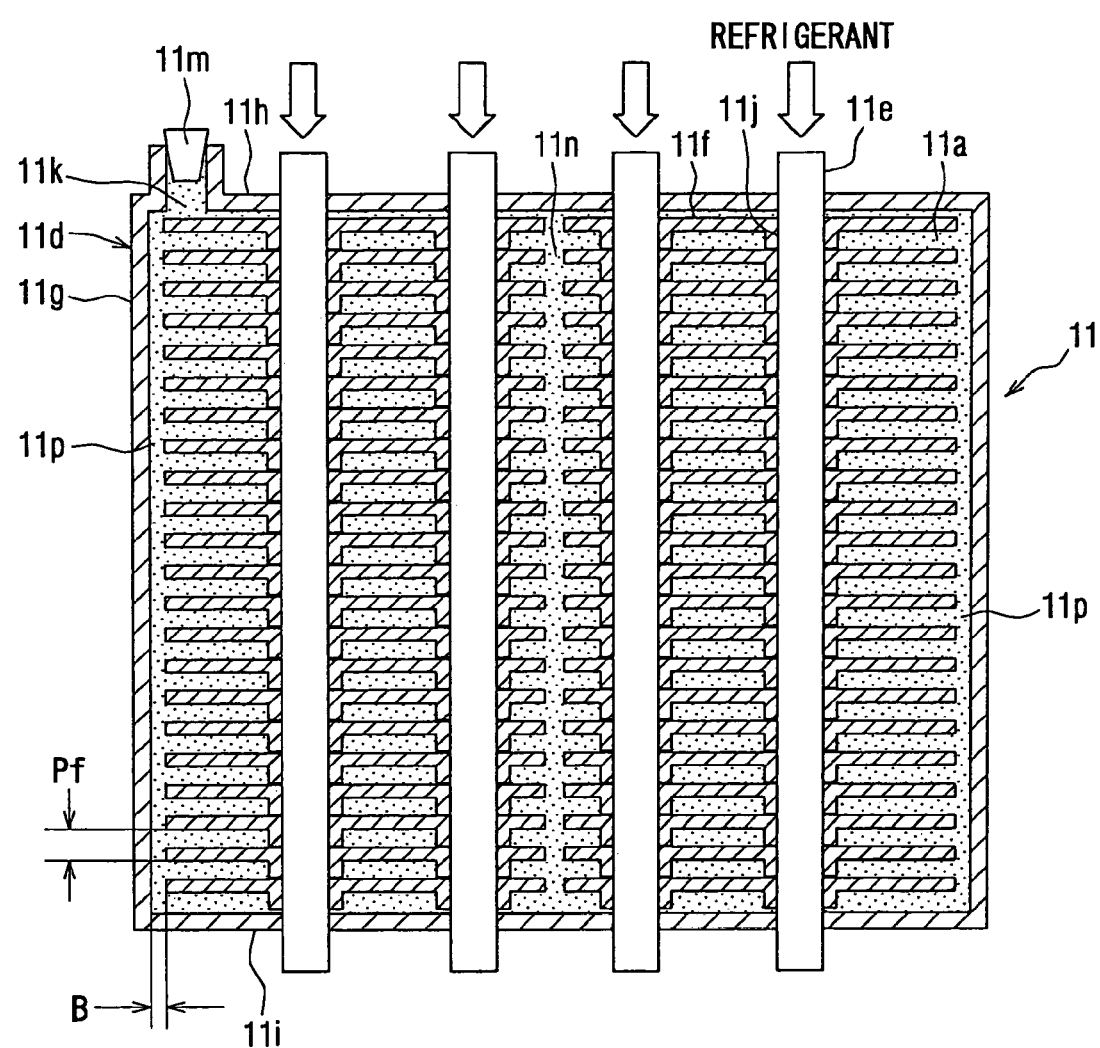
FIG. 3 is a cross-sectional view of a cool storage heat exchanger of the present invention.

FIG. 3 is a cross sectional view showing the cool storage heat exchanger 11, which is formed by a basic structure generally known as a shell-and-tube type. The heat exchanger 11 comprises a shell 11d as a cylindrical tank element, multiple tubes 11e fixed to the shell 11d and forming refrigerant passages, and multiple fins 11f thermally fixed to the tubes 11e and forming enlarged heat transmitting surfaces for the tubes 11e.

The tank element 11d comprises a cylindrical main body 11g, and an upper and lower covers 11h and 11i respectively sealing the upper and lower ends of the cylindrical main body 11g. The tubes 11e are formed from cylindrical tubes and the fins 11f are formed from circular flat plates. Multiple burring holes 11j are formed in the plate fins 11f, so that the tubes 11e are inserted through the burring holes 11j. The multiple plate fins 11f are cumulated with a predetermined fin pitch Pf, and the fins 11f and tubes 11e are mechanically and thermally integrally fixed together by enlarging the tubes 11e after the tubes 11e are inserted into the burring holes 11j of the fins 11f.

An integrated unit of the tubes 11e and fins 11f is then inserted into the cylindrical main body 11g, wherein the upper and lower ends of the tubes 11e protrude from the upper and lower ends of the cylindrical main body 11g of the shell 11d. Then the upper and lower covers 11h and 11i are fixed to the cylindrical main body 11g by soldering or the like. At the same time, the tubes 11e are also fixed to the respective upper and lower covers by the soldering or the like, so that the inside of the heat exchanger 1 is hermetically sealed.

The tubes 11e and the fins 11f as well as the shell 11d are made of such a metal having a high heat conductivity, for example aluminum. An inlet port 11k is formed at the upper cover 11h, through which a cool storage material 11a is filled into the sealed inside space of the shell 11d, wherein the cool storage material 11a are filled between the fins 11f. The inlet port 11k is sealed by a plug 11m after the cool storage material has been filled into the shell 11d.

The cool storage material 11a is preferably a material having a melting point at 4° C. to 8° C. and solid state properties which will not be super cooled. For example, paraffin is preferably used in this embodiment. Since the heat conductivity of the paraffin is much smaller than that of the metal, an area for the heat transmitting surfaces is preferably made large and layers of the paraffin are made thinner, to increase a capacity for the cool storage and the discharge of the stored cool. To this end, the cool storage heat exchanger 11 is formed of the shell-and-tube type heat exchanger and the paraffin are filled therein so that each of the paraffin layers is formed as a thin film between the fins 11f.

The cool storage material 11a causes a phase change depending on the operating modes thereof, namely a mode for the cool storage and a mode for discharging the stored cool. Corresponding to the phase change, a density as well as a volume thereof is changed. A stress will be generated at the fins due to the volume change of the cool storage material, and it would be a cause for a metal fatigue in the cool storage heat exchanger 11. Accordingly, multiple through holes 11n are formed in the laminated plate fins 11f, as shown in FIG. 3. With such arrangements, even when the volume of the cool storage material 11a is increased at the phase change from the solid phase to the liquid phase during the mode for discharging the stored cool, the liquid phase cool storage material can smoothly flow outwardly from the fins to the through holes 11n.

Although the through holes 11n are formed at a center of the laminated respective fins 11f, as shown in FIG. 3, the holes can be additionally formed at other positions of the fins. A circular space 11p having a certain distance B is formed between the inner surface of the cylindrical main body 11g and an outer peripheral end of the fins 11f. The space 11p is formed for the purpose of heat insulation from the outside of the heat exchanger 11, so that the heat insulation effect can be obtained even when the cool storage heat exchanger 11 is arranged at such a position having a higher ambient temperature (for example, in an engine compartment). In the embodiment, the tubes 11e are formed from the cylindrical tubes. However, any other types of tubes, such as flat tubes or flat tubes having multiple passages, can be used.

Referring back to FIG. 1, a bypass flow passage 12 is provided between an inlet side of the compressor 1 (an outlet side of the evaporator 8) and a downstream side of the expansion valve 7 (an upstream side of the cool storage heat exchanger 11), so that the refrigerant bypasses the compressor 1 during a cooling operational mode by the cool storage material. A check valve 13 is provided in the bypass flow passage 12, so that the depressurized refrigerant by the expansion valve 7 is prevented from flowing back to the compressor 1, during a normal cooling operation and a cool storage operation.

A driving flow passage 14 is further provided between an outlet of the condenser device 6 (an upstream side of the expansion valve 7) and an upstream side of the evaporator 8. A control valve 15 and an ejector 9 are provided in the driving flow passage 14, wherein an opening and closing of the control valve 15 is controlled by the A/C control unit 5. The ejector 9 is provided in the embodiment as a driving means for the refrigerant, instead of an electrically driven pump used in a conventional air conditioning system. The ejector 9 is connected at its high pressure inlet port to the control valve 15, and at its outlet port to the evaporator 8.

Figure 4:
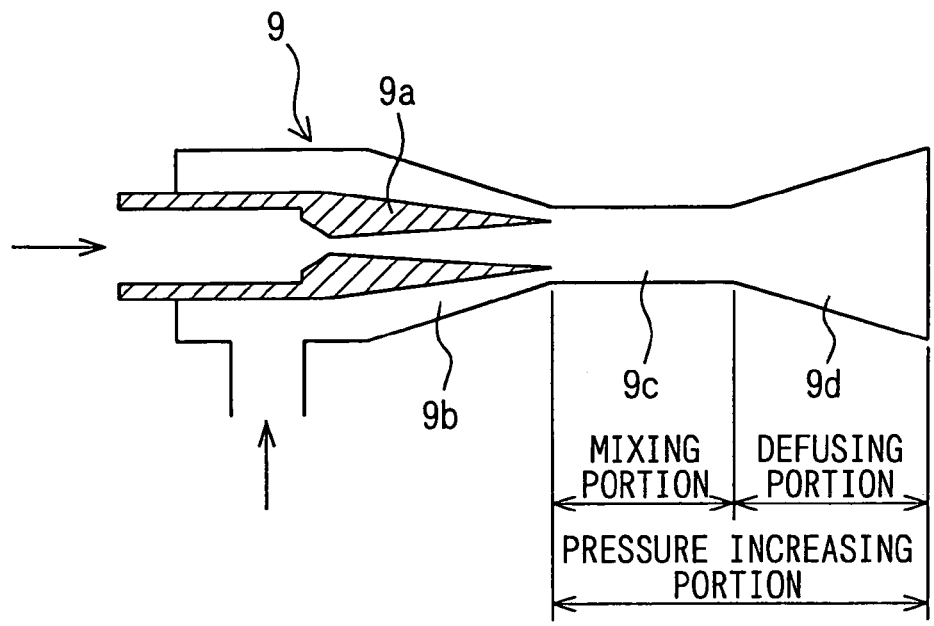
FIG. 4 is a schematic cross sectional view of an ejector of the present invention.

FIG. 4 is a schematic cross sectional view showing the ejector 9, which comprises a nozzle 9a for depressurizing and expanding the refrigerant so that the pressure energy of high pressure refrigerant flowing from the driving flow passage 14 is converted into the speed energy, and a suction portion 9b connected to the cool storage heat exchanger 11 through its suction port and for sucking the refrigerant from the heat exchanger 11 by the refrigerant flow (jet flow) ejected from the nozzle 9a and having a high velocity. The ejector 9 further comprises a mixing portion for mixing the refrigerant ejected from the nozzle 9a with the refrigerant sucked from the cool storage heat exchanger 11, and a defusing portion 9d for converting the speed energy into the pressure energy to thereby increase the pressure of the refrigerant.

The refrigerant from the ejector 9 flows into the evaporator 8. The refrigerant from the ejector 9 is pressurized not only by the defusing portion 9d but also by the mixing portion 9c, at which the refrigerant pressure is increased while the gas-phase refrigerant is sucked from the low pressure side. And therefore, the mixing portion 9c and the defusing portion 9d are collectively referred to as a pressure increasing portion. In the embodiment shown in FIG. 4, a cross sectional area of the mixing portion 9c is constant. However, the inner peripheral surface can be made from a tapered surface, so that the cross sectional area of the mixing portion 9c gradually increase toward the defusing portion 9d.

A communication flow passage 17, which bypasses the ejector 9, is provided between the cool storage heat exchanger 11 and the evaporator 8, so that the refrigerant may flow from the heat exchanger 11 to the evaporator 8 during the normal cooling operation and the cool storage operation, in which the ejector 9 is not operated. A check valve 18 is provided in the communication flow passage 17 for preventing the refrigerant pressurized by the ejector 9 (the defusing portion 9d) from flowing back to the suction portion 9b, during the cooling operation using the stored cooling energy at the heat exchanger 11 in which the ejector 9 is operated.

An operation of the above described first embodiment will be explained with reference to FIGS. 5 and 6, which respectively show the flows of the refrigerant by arrows for the normal cooling operation (and the operation for storing the cooling energy) and for the cooling operation using the stored cooling energy.

Figure 5:
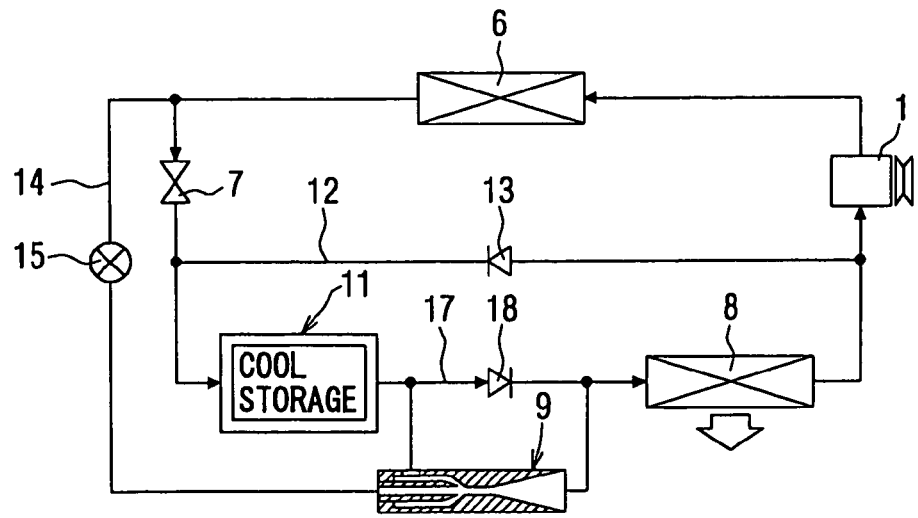
FIG. 5 is a schematic view of a refrigerating cycle of the first embodiment showing a normal cooling operation.
Figure 6:
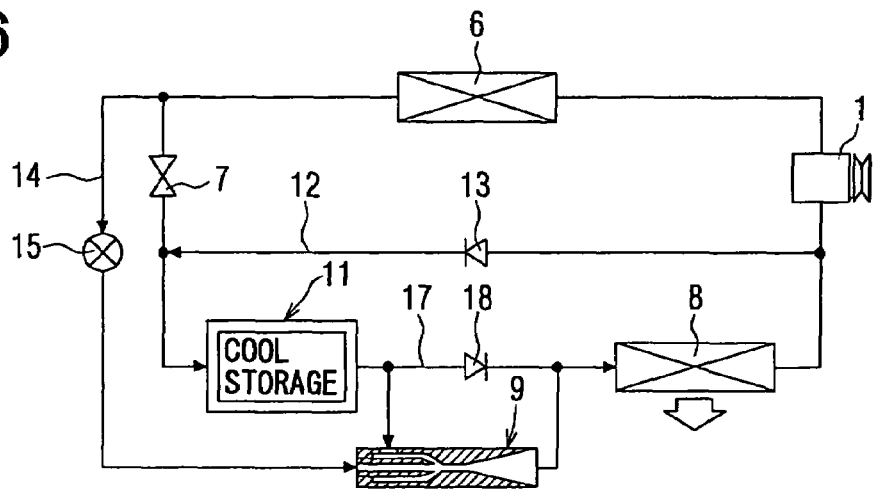
FIG. 6 is also a schematic view of the refrigerating cycle of the first embodiment showing a cooling operation with stored cooling energy.

FIG. 5 is a schematic view showing the refrigerating cycle according to the first embodiment. In the normal cooling operation (and the operation for storing the cooling energy), the refrigerating cycle is operated by the compressor 1 which is driven by the engine 4. In this operation, since the operation of the ejector 9 is not necessary, the control valve 15 is closed by the signal from the A/C control unit 5, so that no refrigerant flows in the driving flow passage 14.

The high pressure gas-phase refrigerant pumped out from the compressor 1 is cooled down at the condenser device 6, and the refrigerant, which is super cooled and becomes the liquid-phase, flows into the expansion valve 7. The high pressure liquid-phase refrigerant is depressurized by the valve portion 7a of the expansion valve 7, so that it becomes two phase (gas-phase and liquid-phase) low pressure refrigerant. Then the refrigerant flows into the cool storage heat exchanger 11, wherein the refrigerant flows through the multiple tubes 11e of the heat exchanger 11.

The refrigerant further flows from the cool storage heat exchanger 11 to the evaporator 8 through the communication passage 17 via the check valve 18. The refrigerant absorbs heat from the air passing through the evaporator in the A/C unit case 21 and is evaporated to become the gas-phase refrigerant. The gas-phase refrigerant is then sucked into the compressor 1 and compressed again. In the bypass flow passage 12, since the pressure at the expansion valve side is higher than the other side pressure, the refrigerant does not flow in the bypass flow passage due to the check valve 13. The cooled down air at the evaporator 8 is blown into the passenger room through the face opening 29 and so on.

The normal cooling operation and the operation for the cool storage will be further explained. The ambient temperature of the air passing through the evaporator 8 during a summer time is high (more than 40° C.) and thereby the thermal load for the evaporator 8 is very high when the air conditioning system is operated in such a condition of the high ambient temperature. In such a cooling operation with a high thermal load, a degree of super heat of the refrigerant at the outlet of the evaporator becomes too high, and the valve portion 7a of the expansion valve 7 is fully opened. As a result, the pressure of the refrigerant at the low pressure side (at the inlet side of the compressor) becomes higher.

Accordingly, the temperature of the low pressure refrigerant flowing into the cool storage heat exchanger 11 becomes higher than a solidification point (6° C. to 8° C.) of the cool storage material 11a. As a result, the cool storage material is not solidified through the heat exchange with the low pressure refrigerant, and only the sensible heat is absorbed from the cool storage material. The amount of the heat absorbed by the low pressure refrigerant at the cool storage heat exchanger 11 is, therefore, very small during the cooling operation of the high cooling load, so that almost all of the low pressure refrigerant is evaporated at the evaporator 8 by absorbing the heat from the air passing through the evaporator 8, as in the same manner of the air conditioning apparatus having no cool storage heat exchanger.

In case of the cooling operation of the high cooling load, an inside air mode is generally selected, in which the inside air is re-circulated by switching the door 23a to a position indicated by a solid line in FIG. 2. The temperature of the air sucked into the A/C unit case 21 and flowing toward the evaporator 8 will be decreased after a certain time period from starting the cooling operation. Then, the cooling load will be decreased. The degree of super heat for the refrigerant at the outlet of the evaporator 8 is decreased, an opening degree of the valve portion 7a of the expansion valve 7 becomes smaller, the refrigerant pressure at the low pressure side is decreased, and finally the refrigerant temperature at the low pressure side is decreased.

Then, when the refrigerant temperature at the low pressure side becomes lower than the solidification point of the cool storage material 11a, the solidification of the cool storage material 11a starts and thereby the latent heat is absorbed by the refrigerant from the cool storage material 11a. Accordingly, the amount of the heat absorbed from the cool storage material 11a becomes larger. The above operation (the solidification of the cool storage material 11a) starts only after the temperature of the air blowing into the passenger room has been sufficiently decreased and the refrigerant temperature at the low pressure side has been sufficiently decreased as a result that the cooling load has been decreased.

A rapid cooling performance (cooling down performance) is thereby not adversely affected by the above cool storage operation in the cool storage material 11a. In other words, even when the cool storage heat exchanger 11 is provided in the refrigerating cycle in series with the evaporator 8, the rapid cooling performance can be maintained even in the high cooling load.

An operation of the air conditioning system when the engine 4 is temporarily stopped, for example in the case of waiting for the change of the traffic lamp, is explained. FIG. 6 is a schematic view showing the refrigerating cycle according to the first embodiment, in which the operation of the compressor 1 is stopped and the cooling operation is continued with the stored cooling energy at the cool storage heat exchanger 11.

When the vehicle stops and the operation of the engine is temporarily stopped, the operation of the compressor 1 is thereby forcibly stopped even when the air conditioning system is in its operation (the blower fan 22 is operating). When the A/C control unit 5 detects the stop of the engine operation, it controls the control valve 15 to open the same, so that the ejector 9 starts its operation.

The high pressure refrigerant pooled in the condenser device 6 flows to the high pressure inlet port of the ejector 9 through the driving flow passage 14. The ejector 9 depressurizes and expands the high pressure refrigerant to convert the pressure energy into the speed energy at the nozzle 9a and sucks the refrigerant from the cool storage heat exchanger 11 by the refrigerant flow (jet flow) ejected from the nozzle 9a and having a high velocity.

Then the refrigerant ejected from the nozzle 9a and the refrigerant sucked from the cool storage heat exchanger 11 are mixed at the pressure increasing portion 9c & 9d, and the speed energy of such refrigerant is converted into the pressure energy to thereby increase the pressure of the refrigerant. And the high pressure refrigerant flows into the evaporator 8.

During the above operation, the check valve 18 provided in the communication flow passage 17 is closed due to the pressure applied thereto in a reversed direction as a result of the pressurizing effect at the ejector 9, while the check valve 13 provided in the bypass flow passage 12 is opened due to the pressure applied thereto in a forward direction. Accordingly, the refrigerant flows from and to the cool storage heat exchanger 11 through the ejector 9, the evaporator 8 and the check valve 13, as indicated by arrows in FIG. 6.

As above, the refrigerant cooled down in the cool storage heat exchanger 11 is evaporated at the evaporator 8 to absorb the heat from the air passing through the evaporator 8, the cooling effect at the evaporator 8 can be continued even after the stop of the compressor operation. Since the temperature of the gas-phase refrigerant evaporated at the evaporator 8 is higher than the solidification point of the cool storage material 11a of the heat exchanger 11, the cool storage material 11a is changed from the solid-phase to the liquid-phase (melted) by absorbing the latent heat of melting from the gas-phase refrigerant.

The gas-phase refrigerant is condensed as it is cooled down by the cool storage material 11a. As long as the high pressure refrigerant remains at the condenser device 6, the cooling operation by the cooling energy stored in the heat exchanger 11 can be continued, even during the engine 4 is stopped.

A time period of the vehicle stop for waiting for the change of the traffic lamp is generally a short period, such as one to two minutes. The necessary amount of the cool storage material 11a for the cooling operation for two minutes is about 420 g of paraffin, in the case that the solidification point is 6° C. and the latent heat for the solidification is 229 kj/Kg.

According to the above first embodiment, the refrigerating cycle for the normal cooling operation is composed of the compressor 1, the condenser device 6, the expansion valve 7, the cool storage heat exchanger 11, and the evaporator 8. And another (second) refrigerating cycle for the cooling operation with the stored cooling energy during the compressor operation is stopped is composed of the cool storage heat exchanger 11, the ejector 9 (the high pressure inlet port and the outlet port), the evaporator 8, the bypass flow passage 12 and the check valve 13. In the second refrigerating cycle, the refrigerant is circulated by the operation of the ejector 9, which operates by a pressure difference in the refrigerating cycle.

According to the present invention, the ejector 9 is used for circulating the refrigerant instead of the electrically driven pump, in the case the engine operation is temporarily stopped. When the compressor is stopped, the pressure of the refrigerant at the high pressure side and the low pressure side will not be quickly uniformed. And thereby, so long as the pressure difference of the refrigerant is existing in the refrigerating cycle and the stored cooling energy remains in the cool storage material 11a, the cooling operation using the stored cooling energy can be continued. According to experiments of the present inventors, the cooling operation (the operation of the ejector 9) can be continued for a time period more than 90 seconds, in the case that the flow rate of 20 Kg/h is obtained.

Since the ejector 9 is the fluid pump, it can generate a sufficient sucking effect for sucking two-phase (the gas-phase and the liquid-phase) mixing refrigerant. As a result, a tank for separating the gas-phase and liquid-phase refrigerant, which is necessary in the system using the electrically driven pump for predominantly supplying the liquid-phase refrigerant to the electrically driven pump, is no longer necessary in the present invention. Accordingly, a space for such separating tank is saved. Furthermore, since the velocity of the flow in the evaporator 8 can be increased by eliminating the separating tank, the heat transmission performance can be improved.

Figure 7:
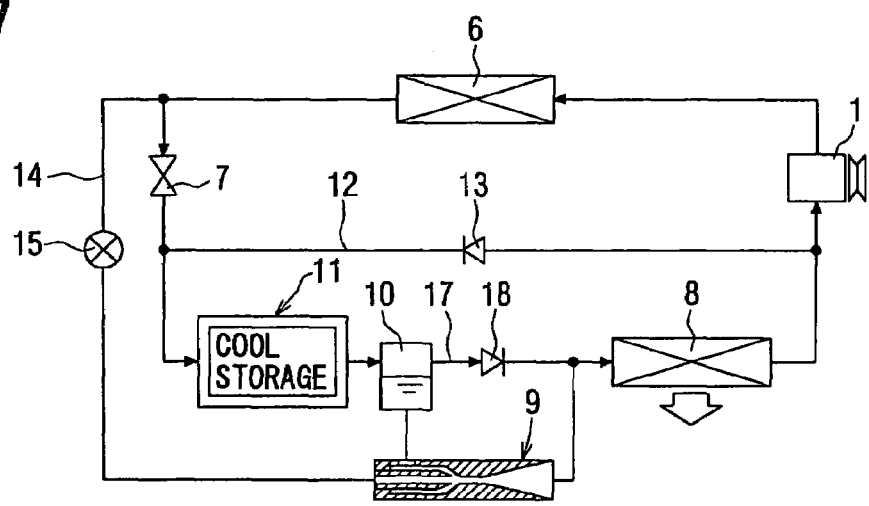
FIG. 7 is a schematic view of a modified refrigerating cycle of the first embodiment.

The above first embodiment can be modified as shown in FIG. 7, in which a liquid tank 10 is provided between the cool storage heat exchanger 11 and the check valve 18 so that the liquid-phase refrigerant is stored in the lower portion of the liquid tank 10.

In a case of a generally known liquid pump, a sufficient pump efficiency can be obtained when the liquid-phase fluid alone is supplied to the liquid pump. However, when the mixture of the liquid-phase and the gas-phase fluid is supplied to the liquid pump, the pump efficiency is remarkably decreased in most cases, which is generally referred to as "dry-lift".

On the other hand, in a case of the fluid pump of the ejector 9, the pump efficiency is not decreased because of operational characteristic, even when the mixture of the liquid-phase and the gas-phase refrigerant is supplied to the ejector 9.

Furthermore, the ejector 9 circulates the refrigerant by use of the energy contained in the high pressure refrigerant, and thereby it does not require electrical lead wires which is necessary in the case of the electrically driven pump. Furthermore, the ejector 9 does not have rotational wear-out elements, such as brushes, and thereby the ejector 9 has a semi-permanent durability.

In the case that the cool storage heat exchanger 11 is arranged at the outlet side of the evaporator 8, and when the cooling energy is fully stored in the cool storage material 11a, then the degree of the super heat of the refrigerant becomes lower after having passed through the cool storage heat exchanger 11, because the refrigerant will be cooled down at the heat exchanger 11.

As a result, the opening degree of the expansion valve 7 is decreased and the amount of the refrigerant may become smaller for satisfying the cooling load at the evaporator 8. Accordingly, the cool storage heat exchanger 11 is preferably arranged at the upstream side of the evaporator 8 in the above first embodiment.

Second Embodiment

A second embodiment of the present invention is explained with reference to FIG. 8 and FIG. 9, which schematically show the refrigerating cycle.

In the second embodiment, the bypass flow passage 12 (of the first embodiment) is eliminated, and instead a suction flow passage 16 is provided between the suction port of the ejector 9 and the inlet side of the compressor 1 (the outlet side of the evaporator 8). Further, the pressure increasing portion (the outlet port) of the ejector 9 is connected to the upstream side of the cool storage heat exchanger 11 through the check valve 13.

Figure 8:
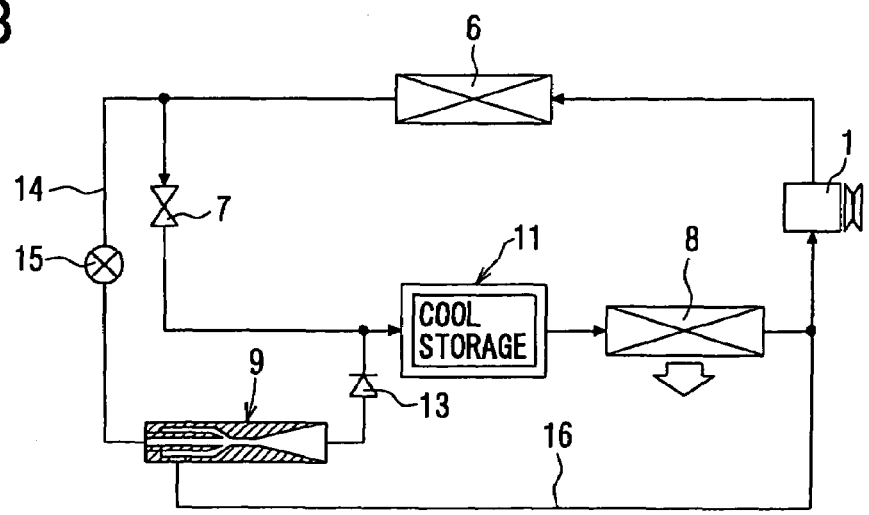
FIG. 8 is a schematic view of a refrigerating cycle of a second embodiment showing a normal cooling operation.

As shown in FIG. 8, in the normal cooling operation (and the operation for storing the cooling energy), the refrigerating cycle is operated by the compressor 1, so that the refrigerant flows from and to the compressor 1 through the condenser device 6, the expansion valve 7, the cool storage heat exchanger 11, and the evaporator 8. In this operation, since the operation of the ejector 9 is not necessary, the control valve 15 is closed by the signal from the A/C control unit 5, so that no refrigerant flows in the driving flow passage 14, as in the same manner to the first embodiment.

Figure 9:
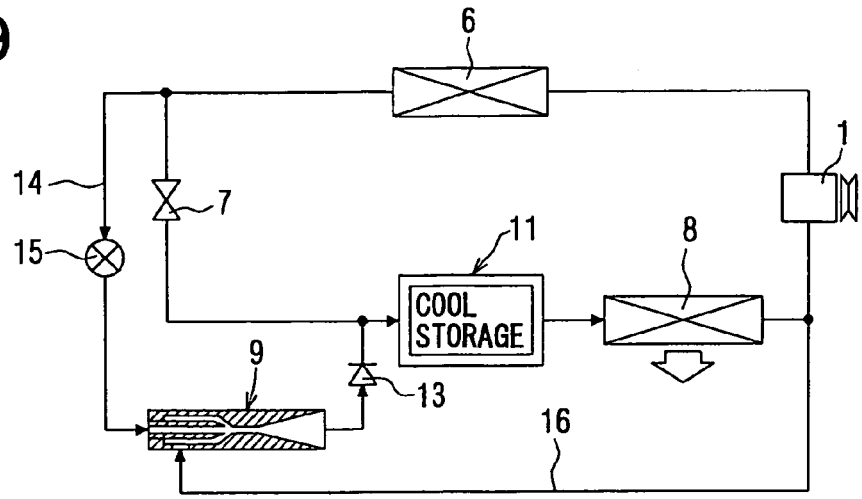
FIG. 9 is also a schematic view of the refrigerating cycle of the second embodiment showing a cooling operation with stored cooling energy.

FIG. 9 shows the refrigerating cycle, in which the operation of the compressor 1 is stopped and the cooling operation is continued with the stored cooling energy at the cool storage heat exchanger 11. As in the same manner to the first embodiment, when the A/C control unit 5 detects the stop of the engine operation, it controls the control valve 15 to open the same, so that the ejector 9 starts its operation.

The high pressure refrigerant pooled in the condenser device 6 flows to a high pressure inlet port of the ejector 9 through the driving flow passage 14. Then, the ejector 9 sucks the refrigerant from the suction flow passage 16 and the refrigerant is circulated from and to the ejector 9 through the check valve 13, the cool storage heat exchanger 11, the evaporator 8 and the suction flow passage 16, so that the cooling operation is continued.

According to the above second embodiment, the refrigerating cycle for the normal cooling operation is composed of the compressor 1, the condenser device 6, the expansion valve 7, the cool storage heat exchanger 11, and the evaporator 8. And another (second) refrigerating cycle for the cooling operation with the stored cooling energy during the compressor operation is stopped is composed of the cool storage heat exchanger 11, the evaporator 8, the suction flow passage 16, the ejector 9 (the suction port and the outlet port), and the check valve 13. In the second refrigerating cycle, the refrigerant is likewise circulated by the operation of the ejector 9, which operates by a pressure difference in the refrigerating cycle.

According to the second embodiment, the bypass flow passage 12 including the check valve 13 in the first embodiment (FIGS. 5 & 6) is eliminated, and instead the suction flow passage 16 is provided. As above, the second embodiment is further made in a simplified manner (at least the check valve 13 is not necessary).

Third Embodiment

A third embodiment of the present invention is explained with reference to FIGS. 10 and 11, which schematically show the refrigerating cycle.

In the first or second embodiment, the expansion valve 7 is used as a depressurizing means, and the degree of the super heat of the refrigerant at the outlet of the evaporator 8 is controlled by the expansion valve 7.

According to the third embodiment, an accumulator 100 is provided at the outlet side of the evaporator 8 (the inlet side of the compressor 1) for separating the refrigerant from the evaporator 8 into the gas-phase and the liquid-phase refrigerant, for storing the separated refrigerant, and for supplying the gas-phase refrigerant to the compressor 1. The above refrigerating cycle is also referred to as "the refrigerating cycle of accumulator type" or "the accumulator cycle". Further, a fixed orifice 70, such as a capillary tube orifice, is provided as the depressurizing means instead of the expansion valve 7.

Figure 10:
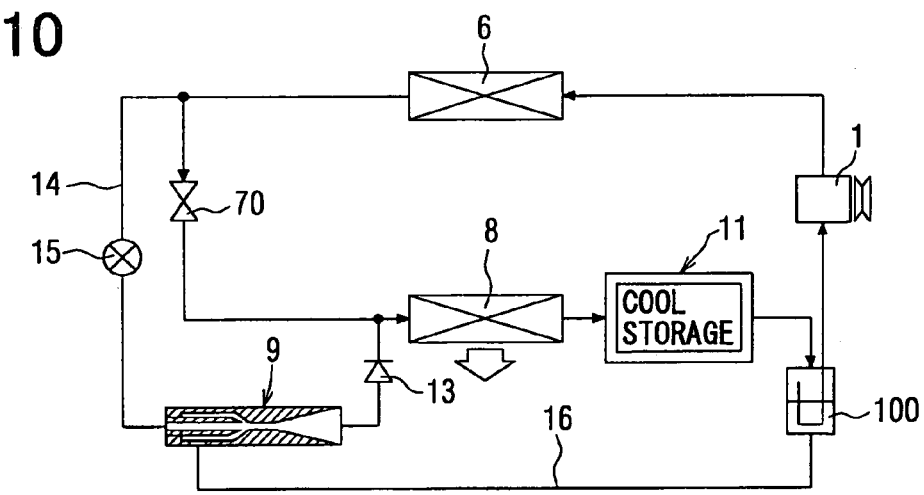
FIG. 10 is a schematic view of a refrigerating cycle of a third embodiment showing a normal cooling operation.

As shown in FIG. 10, in the normal cooling operation (and the operation for storing the cooling energy), the refrigerating cycle is operated by the compressor 1, so that the refrigerant flows from and to the compressor 1 through the condenser device 6, the fixed orifice 70, the evaporator 8, the cool storage heat exchanger 11, and the accumulator 100. In this operation, since the operation of the ejector 9 is not necessary, the control valve 15 is closed by the signal from the A/C control unit 5, so that no refrigerant flows in the driving flow passage 14 and the suction flow passage 16.

Figure 11:
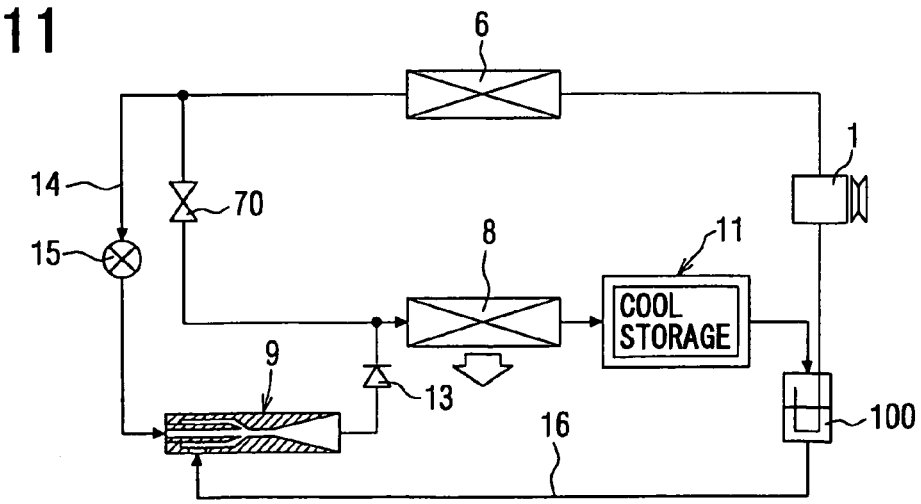
FIG. 11 is also a schematic view of the refrigerating cycle of the third embodiment showing a cooling operation with stored cooling energy.

FIG. 11 shows the refrigerating cycle, in which the operation of the compressor 1 is stopped and the cooling operation is continued with the stored cooling energy at the cool storage heat exchanger 11. As in the same manner to the first embodiment, when the A/C control unit 5 detects the stop of the engine operation, it controls the control valve 15 to open the same, so that the ejector 9 starts its operation.

The high pressure refrigerant pooled in the condenser device 6 flows to a high pressure inlet port of the ejector 9 through the driving flow passage 14. Then, the ejector 9 sucks the refrigerant from the suction flow passage 16 and the refrigerant is circulated from and to the ejector 9 through the check valve 13, the evaporator 8, the cool storage heat exchanger 11, the accumulator 100 and the suction flow passage 16, so that the cooling operation is continued.

According to the above third embodiment, the refrigerating cycle for the normal cooling operation is composed of the compressor 1, the condenser device 6, the fixed orifice 70, the evaporator 8, the cool storage heat exchanger 11, and the accumulator 100 (the gas-phase portion). And another (second) refrigerating cycle for the cooling operation with the stored cooling energy during the compressor operation is stopped is composed of the cool storage heat exchanger 11, the accumulator (the liquid-phase portion), the suction flow passage 16, the ejector 9 (the suction port and the outlet portion), the check valve 13 and the evaporator 8. In the second refrigerating cycle, the refrigerant is likewise circulated by the operation of the ejector 9, which operates by a pressure difference in the refrigerating cycle.

As already explained above, the accumulator 100 separates the refrigerant from the evaporator 8 into the gas-phase and the liquid-phase refrigerant, and supplies the gas-phase refrigerant to the compressor 1. Accordingly, a possible compression of the liquid-phase refrigerant by the compressor 1 can be prevented, without adjusting the degree of the super heat of the refrigerant at the outlet side of the evaporator 8. The fixed orifice 70 is simpler in structure and lower in cost than the thermal type expansion valve having a function of adjusting the degree of super heat of the refrigerant.

According to the third embodiment, the cool storage heat exchanger 11 is provided at the downstream side of the evaporator 8. As is also explained above, the depressurizing means can be formed by the capillary tubes and the fixed orifice 70 in the accumulator cycle, and therefore the expansion valve is not necessary. As a result, no problem occurs for adjusting the degree of the super heat of the refrigerant at the outlet side of the evaporator 8, even in the case that the cool storage heat exchanger 11 is connected to the outlet side of the evaporator 8.

A pressure drop is always generated in the refrigerant flowing through the evaporator 8, so that the refrigerant pressure (evaporation pressure) at the outlet side of the evaporator 8 is lower than that at the inlet side thereof. A gas-liquid phase boundary of the refrigerant is generated in the accumulator 100, and the refrigerant is in its saturated state. Accordingly, the refrigerant in the accumulator 100 is not be super heated.

Further, the refrigerant temperature (evaporation temperature) at the outlet side of the evaporator 8 is always lower than that at the inlet side thereof corresponding to the pressure drop. And thereby, the cool storage material 11*a* can be cooled down by the refrigerant having a lower temperature, in the case that the cool storage heat exchanger 11 is connected to the outlet side of the evaporator 8 in the accumulator cycle. In this operation of cooling down the cool storage material 11*a*, a temperature difference between the refrigerant and the cool storage material 11*a* is increased to improve the heat exchange efficiency and to shorten the necessary time for solidifying the cool storage material 11*a*.

Fourth Embodiment

A fourth embodiment of the present invention is explained with reference to FIGS. 12 and 13, which schematically show the refrigerating cycle.

In the above third embodiment, the fixed orifice 70 (the capillary tube and orifice) is used as the depressurizing means. According to the fourth embodiment, however, a variable orifice 700 is provided instead of the fixed orifice 70, wherein the variable orifice 700 is controlled by the A/C control unit 5. Furthermore, in the fourth embodiment, the driving flow passage 14 bypassing the fixed orifice (of the third embodiment) is eliminated and the outlet side of the condenser device 6 is connected to the high pressure inlet port of the ejector 9 through the variable orifice 700. The ejector 9 sucks the refrigerant from the suction flow passage 16 and flows out the mixed and pressurized refrigerant to the evaporator 8.

Figure 12:
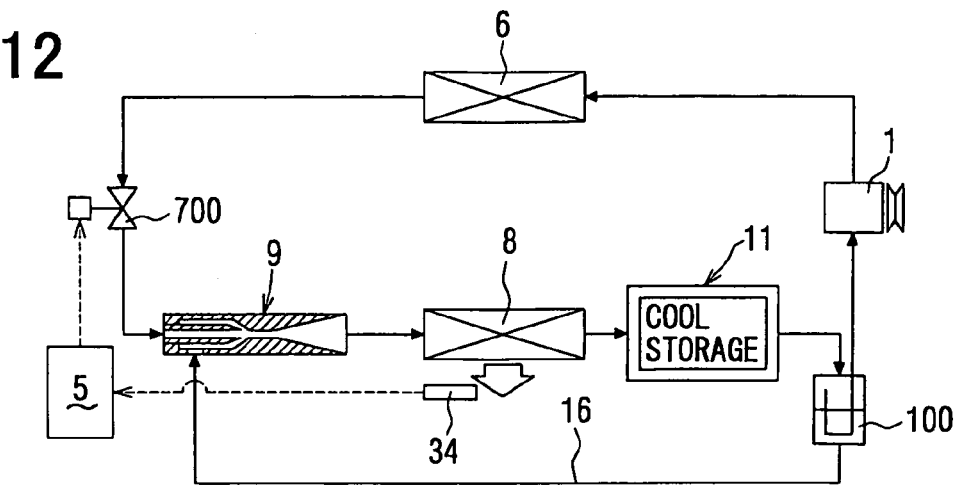
FIG. 12 is a schematic view of a refrigerating cycle of a fourth embodiment showing a normal cooling operation.

As shown in FIG. 12, in the normal cooling operation (and the operation for storing the cooling energy), the refrigerating cycle is operated by the compressor 1, so that the refrigerant flows from and to the compressor 1 through the condenser device 6, the variable orifice 700, the ejector 9, the evaporator 8, the cool storage heat exchanger 11, and the accumulator 100. In this operation, the variable orifice 700 is controlled by the A/C control unit 5, so that the flow amount of the refrigerant is adjusted in accordance with the cooling load. Further, in this operation, the liquid-phase refrigerant pooled in the accumulator 100 is sucked into the ejector 9 through the suction flow passage 16.

Figure 13:
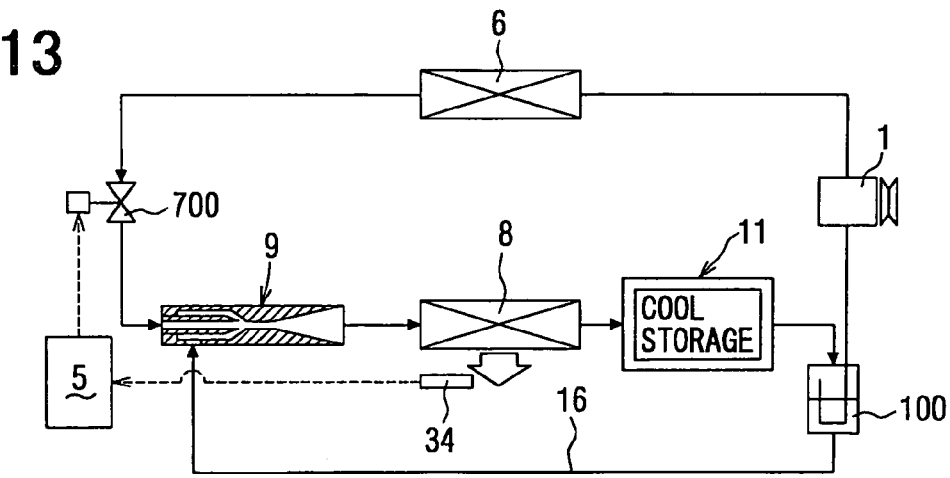
FIG. 13 is also a schematic view of the refrigerating cycle of the fourth embodiment showing a cooling operation with stored cooling energy.

FIG. 13 shows the refrigerating cycle, in which the operation of the compressor 1 is stopped and the cooling operation is continued with the stored cooling energy at the cool storage heat exchanger 11. When the A/C control unit 5 detects the stop of the engine operation, it controls the variable orifice 700 so that the flow amount of the refrigerant is likewise controlled.

The high pressure refrigerant pooled in the condenser device 6 flows to the high pressure inlet port of the ejector 9 through the variable orifice 700. Then, the ejector 9 sucks the refrigerant from the suction flow passage 16 and the refrigerant is circulated from and to the ejector 9 through the evaporator 8, the cool storage heat exchanger 11, the accumulator 100 and the suction flow passage 16, so that the cooling operation is continued.

According to the above fourth embodiment, the refrigerating cycle for the normal cooling operation is composed of the compressor 1, the condenser device 6, the variable orifice 700, the ejector 9 (the high pressure inlet port and the outlet port), the evaporator 8, the cool storage heat exchanger 11, and the accumulator 100 (the gas-phase portion). And another (second) refrigerating cycle for the cooling operation with the stored cooling energy during the compressor operation is stopped is composed of the cool storage heat exchanger 11, the accumulator 100 (the liquid-phase portion), the ejector 9 (the suction port and the outlet port), and the evaporator 8. In the second refrigerating cycle, the refrigerant is likewise circulated by the operation of the ejector 9, which operates by a pressure difference in the refrigerating cycle.

According to the fourth embodiment, as described above, the variable orifice 700 is provided in the accumulator cycle, wherein the variable orifice 700 has functions of the control valve 15 and the fixed orifice 70 of the third embodiment. The variable orifice 700 comprises an electrically controlled expansion valve to control an opening degree of the orifice. According to the fourth embodiment, the opening degree of the variable orifice 700 during the normal cooling operation by the compressor 1 is controlled in accordance with the thermal load (the cooling load) of the air conditioning system based on the temperature of the air passing through the evaporator 8, the refrigerant temperature at the outlet portion of the cool storage heat exchanger 11, and so on.

Figure 25:
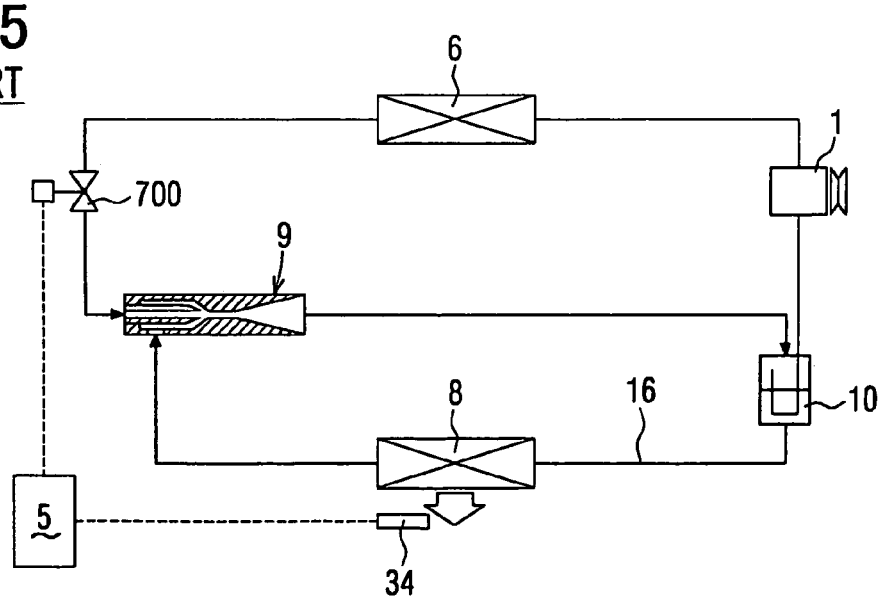

The opening degree of the variable orifice 700 is adjusted, during the cooling operation with the stored cooling energy in which the operation of the compressor 1 is stopped, in such a manner that the suction flow of the refrigerant at the ejector 9 can meet a target cooling performance which will be determined by the thermal load and comfortable air conditioning operation. The evaporator 8 and the cool storage heat exchanger 11 (the heat exchanger at the load side) are provided at the downstream side of the ejector 9 in the fourth embodiment. Since the above arrangement of the ejector 9 and the evaporator 8 of the fourth embodiment is different from that of a conventional normal ejector cycle, as shown in FIG. 25, the power saving function at the compressor 1 which is generally achieved in the normal ejector cycle can not be obtained in this embodiment.

The accumulator 100 is provided in the suction flow passage 16, for separating the refrigerant from the evaporator 8 into the gas-phase and the liquid-phase refrigerant and pooling the liquid-phase refrigerant at the lower portion of the accumulator 100. The gas-phase refrigerant is sucked by the compressor 1 from the upper portion of the accumulator 100. Accordingly, the compressor 1 is prevented from compressing the liquid-phase refrigerant, even when the variable orifice 700 is used as the depressurizing means and the refrigerant flow in the cycle is not controlled based on the degree of the super heat of the refrigerant at the outlet portion of the evaporator 8.

The control for the opening degree of the variable orifice 700 is generally difficult unless the degree of the super heat of the refrigerant at the inlet side of the compressor 1 is higher than a predetermined value. As a result, it becomes also difficult to keep the liquid-phase refrigerant in the operation for storing the cooling energy in the cool storage material. According to the fourth embodiment, however, the accumulator 100 is provided for separating the refrigerant into the gas-phase and the liquid-phase refrigerant and for supplying the liquid-phase refrigerant to the ejector 9, so that the liquid-phase refrigerant is supplied to the cool storage heat exchanger 11 to effectively cool down and store the cooling energy in the cool storage material.

Fifth Embodiment

A fifth embodiment of the present invention is explained with reference to FIGS. 14 and 15, which schematically show the refrigerating cycle.

In the above fourth embodiment (FIGS. 12 & 13), the evaporator 8 and the cool storage heat exchanger 11 are provided at the downstream side of the ejector 9. According to the fifth embodiment (FIGS. 14 & 15), however, the evaporator 8 and the cool storage heat exchanger 11 are provided in the suction flow passage 16.

Figure 14:
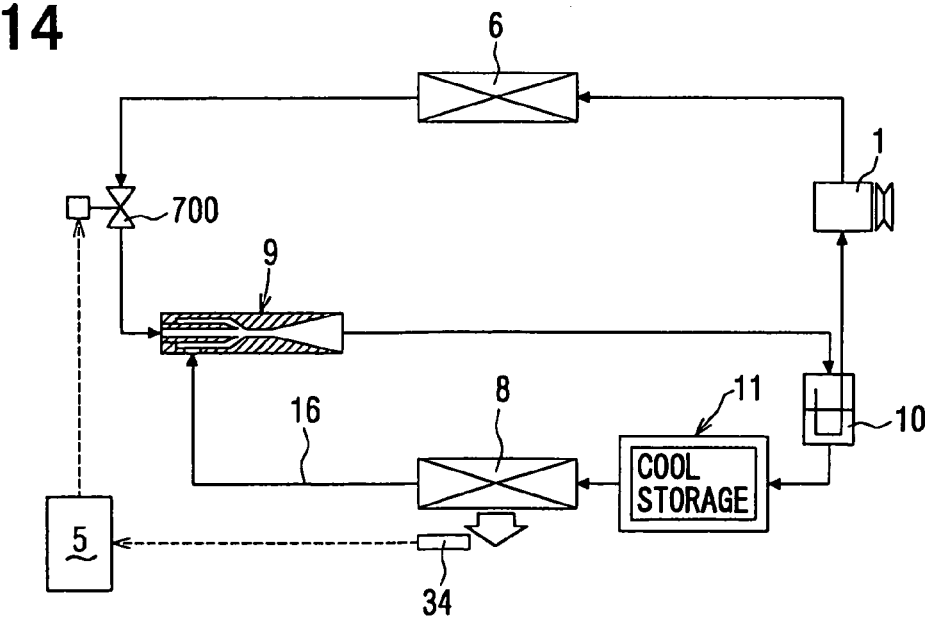
FIG. 14 is a schematic view of a refrigerating cycle of a fifth embodiment showing a normal cooling operation.

As shown in FIG. 14, in the normal cooling operation (and the operation for storing the cooling energy), the refrigerating cycle is operated by the compressor 1, so that the refrigerant flows from the compressor 1 through the condenser device 6, the variable orifice 700, the ejector 9, the accumulator 100 (the gas-phase portion), and then back to the compressor 1. Furthermore, the refrigerant pooled in the accumulator 100 flows through the cool storage heat exchanger 11, the evaporator 8 and the ejector 9, and back to the accumulator 100.

Figure 15:
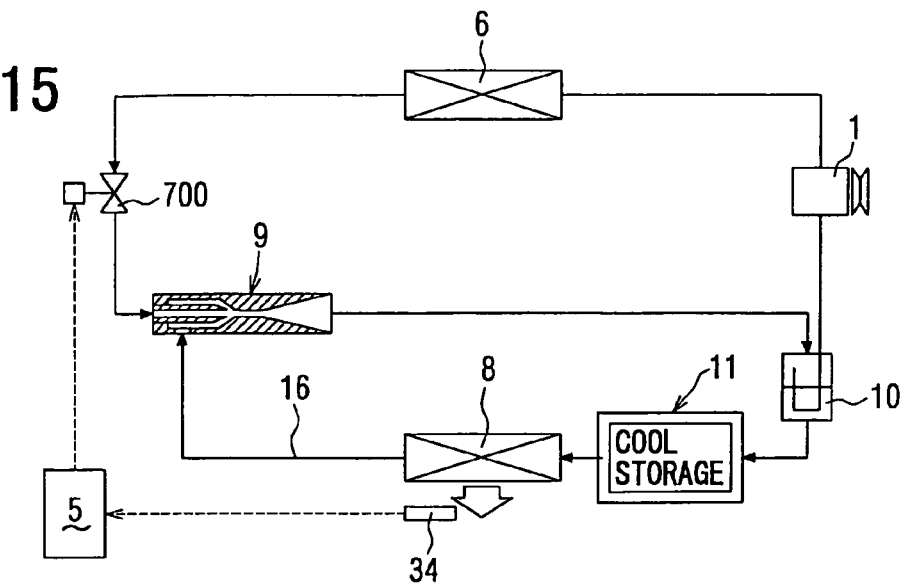
FIG. 15 is also a schematic view of the refrigerating cycle of the fifth embodiment showing a cooling operation with stored cooling energy.

FIG. 15 shows the refrigerating cycle, in which the operation of the compressor 1 is stopped and the cooling operation is continued with the stored cooling energy at the cool storage heat exchanger 11. When the A/C control unit 5 detects the stop of the engine operation, it controls the variable orifice 700 so that the flow amount of the refrigerant is controlled.

The high pressure refrigerant pooled in the condenser device 6 flows to the high pressure inlet port of the ejector 9 through the variable orifice 700. Then, the ejector 9 sucks the refrigerant from the suction flow passage 16 and the refrigerant is circulated from and to the ejector 9 through the accumulator 100, the cool storage heat exchanger 11, the evaporator 8 and the suction flow passage 16.

As above, according to the fifth embodiment, the refrigerant from the pressure increasing portion 9c & 9d flows into the accumulator 100, and the evaporator 8 and the cool storage heat exchanger 11 are connected in series to the suction port of the ejector 9 via the suction flow passage 16, to achieve the power saving performance. According to the arrangement above, the evaporation pressure of the refrigerant at the evaporator 8 and the cool storage heat exchanger 11 can be decreased to become lower than the refrigerant pressure at the inlet side of the compressor 1, so that the function of the ejector 9 can be demonstrated.

Sixth Embodiment

A sixth embodiment of the present invention is explained with reference to FIGS. 16 and 17, which schematically show the refrigerating cycle.

In the above fifth embodiment (FIGS. 14 & 15), the evaporator 8 and the cool storage heat exchanger 11 are provided in the suction flow passage 16. According to the sixth embodiment (FIGS. 16 & 17), however, the evaporator 8 is provided at the downstream of the ejector 9 and the cool storage heat exchanger 11 is provided in the suction flow passage 16.

Figure 16:
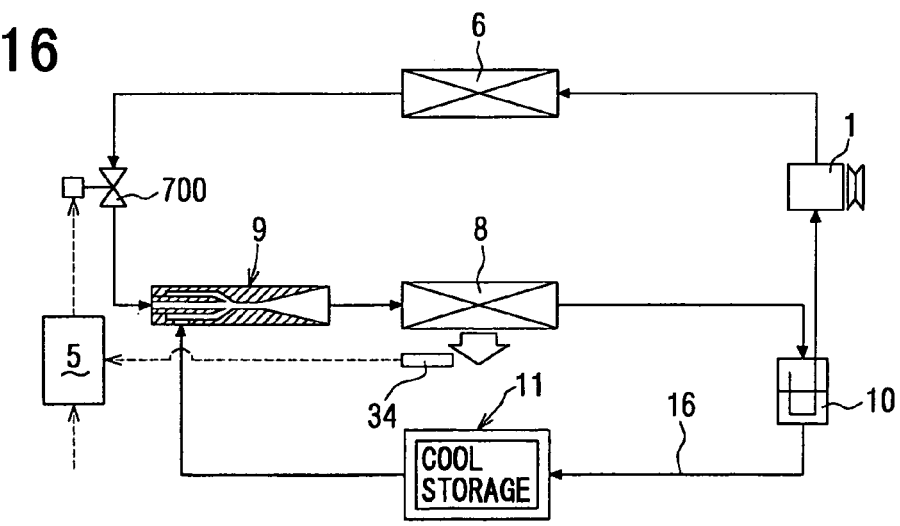
FIG. 16 is a schematic view of a refrigerating cycle of a sixth embodiment showing a normal cooling operation.

As shown in FIG. 16, in the normal cooling operation (and the operation for storing the cooling energy), the refrigerating cycle is operated by the compressor 1, so that the refrigerant flows from the compressor 1 through the condenser device 6, the variable orifice 700, the ejector 9, the evaporator 8 and the accumulator 100, and back to the compressor 1. Furthermore, the refrigerant pooled in the accumulator 100 flows through the cool storage heat exchanger 11 and the ejector 9, and back to the accumulator 100.

Figure 17:
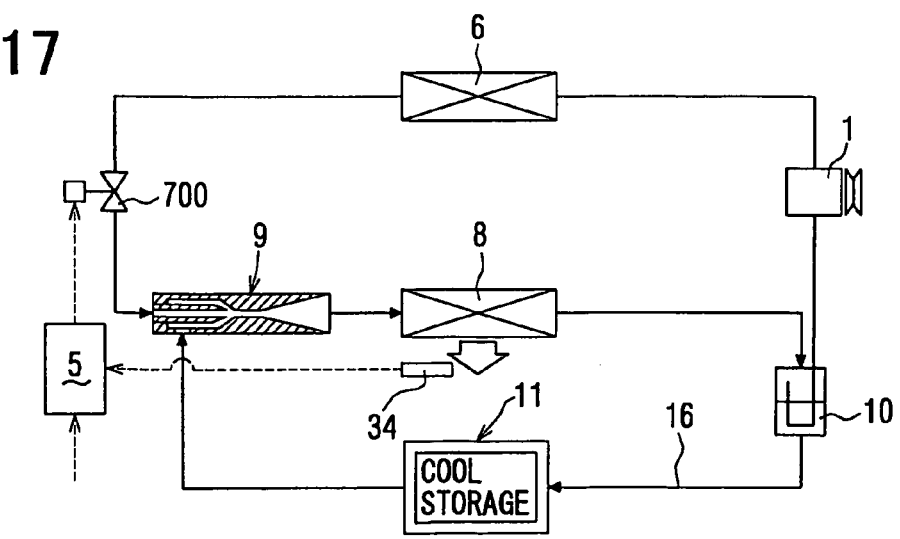
FIG. 17 is also a schematic view of the refrigerating cycle of the sixth embodiment showing a cooling operation with stored cooling energy.

FIG. 17 shows the refrigerating cycle, in which the operation of the compressor 1 is stopped and the cooling operation is continued with the stored cooling energy at the cool storage heat exchanger 11. When the A/C control unit 5 detects the stop of the engine operation, it controls the variable orifice 700 so that the flow amount of the refrigerant is controlled.

The high pressure refrigerant pooled in the condenser device 6 flows to the high pressure inlet port of the ejector 9 through the variable orifice 700. Then, the ejector 9 sucks the refrigerant from the suction flow passage 16 and the refrigerant is circulated from and to the ejector 9 through the evaporator 8, the accumulator 100, the cool storage heat exchanger 11 and the suction flow passage 16.

According to the above sixth embodiment, the refrigerating cycle for the normal cooling operation is composed of the compressor 1, the condenser device 6, the variable orifice 700, the ejector 9 (the high pressure inlet port and the outlet port), the evaporator 8, and the accumulator 100 (the gas-phase portion). And another (second) refrigerating cycle for the cooling operation with the stored cooling energy during the compressor operation is stopped is composed of the cool storage heat exchanger 11, the ejector 9 (the suction port and the outlet port), the evaporator 8, and the accumulator 100 (the liquid-phase portion). In the second refrigerating cycle, the refrigerant is likewise circulated by the operation of the ejector 9, which operates by a pressure difference in the refrigerating cycle.

The amount of the power saving effect by the ejector cycle depends on the kind of the refrigerant to be used for the refrigerating cycle. In the case of HFC134a, which is generally used for the air conditioning system for the vehicle, the power saving effect is relatively small, because the refrigerant pressure pumped out from the compressor 1 is relatively low.

A time delay, which is a time interval from the start of the compressor operation to a time point at which the temperature of the air passing through the evaporator and blown into the passenger room is decreased, may occur when the temperature of the cool storage heat exchanger 11 as well as the thermal load (the cooling load) are rather high in the fifth embodiment, because a major portion of the liquid-phase refrigerant would be evaporated in the cool storage heat exchanger 11. The evaporator 8 is, therefore, provided at the downstream side of the ejector 9 and the cool storage heat exchanger 11 is provided in the suction flow passage 16 according to the sixth embodiment, to improve the above time delay.

As in the similar manner to the fourth embodiment (FIGS. 12 & 13), the accumulator 100 is provided in the suction flow passage 16, for separating the refrigerant from the evaporator 8 into the gas-phase and the liquid-phase refrigerant and pooling the liquid-phase refrigerant at the lower portion of the accumulator 100. The gas-phase refrigerant is sucked by the compressor 1 from the upper portion of the accumulator 100. Accordingly, the compressor 1 is prevented from compressing the liquid-phase refrigerant, even when the variable orifice 700 is used as the depressurizing means and the refrigerant flow in the cycle is not controlled based on the degree of the super heat of the refrigerant at the outlet portion of the evaporator 8.

Furthermore, as in the similar manner to the fourth embodiment (FIGS. 12 & 13), the accumulator 100 is provided in the sixth embodiment (FIGS. 16 & 17) for separating the refrigerant into the gas-phase and the liquid-phase refrigerant and for supplying the liquid-phase refrigerant to the cool storage heat exchanger 11, to effectively cool down and store the cooling energy in the cool storage material.

The variable orifice 700 having an electrically controlled valve is used in the above embodiments. It is, however, not limited to such electrical type variable orifice.

Figure 18:
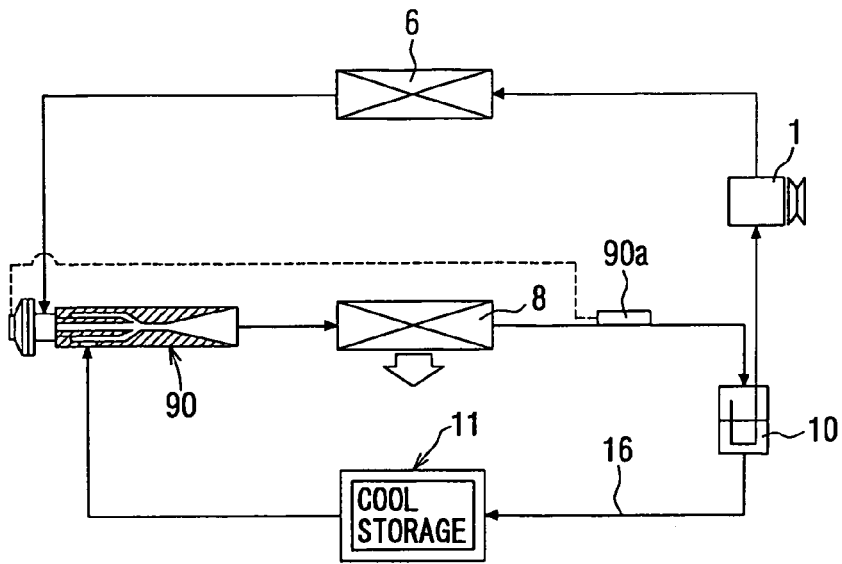
FIG. 18 is a schematic view of a modified refrigerating cycle of the sixth embodiment.

FIG. 18 shows a modification of the above embodiments, for example the modification of the sixth embodiment (FIGS. 16 & 17), in which an ejector 90 having a mechanical type variable orifice 90 is used. Numeral 90a is a temperature sensing portion for mechanically controlling the opening degree of the orifice. With such an arrangement, the same operation and effect to the sixth embodiment can be obtained.

Seventh Embodiment

A seventh embodiment of the present invention is explained with reference to FIGS. 19 and 20, which schematically show the refrigerating cycle.

The seventh embodiment differs from the first embodiment (FIGS. 5 & 6) in that the bypass flow passage 12 is connected between the inlet side of the compressor 1 and the downstream side of the cool storage heat exchanger 11 according to the seventh embodiment, whereas the bypass flow passage 12 is connected between the inlet side of the compressor 1 and the upstream side of the cool storage heat exchanger 11 according to the first embodiment. And it further differs in that a direction of the refrigerant flow in the cool storage heat exchanger 11 is reversed in the cooling operation with the stored cooling energy in the cool storage material during the compressor operation is stopped, whereas the refrigerant flow is always kept in the same direction in the first embodiment.

According to the seventh embodiment (FIGS. 19 & 20), the communication flow passage 17 is provided in parallel with the ejector 9, so that the refrigerant flows from the cool storage heat exchanger 11 to the evaporator 8 in the normal cooling operation (and the operation for cooling down the cool storage material), in which the ejector 9 is not operated. And the check valve 18 is provided in the communication flow passage 17, so that the refrigerant pressurized by the ejector 9 can not flow back to the cool storage heat exchanger 11 in the cooling operation with the stored cooling energy, in which the ejector 9 is operated.

Figure 19:
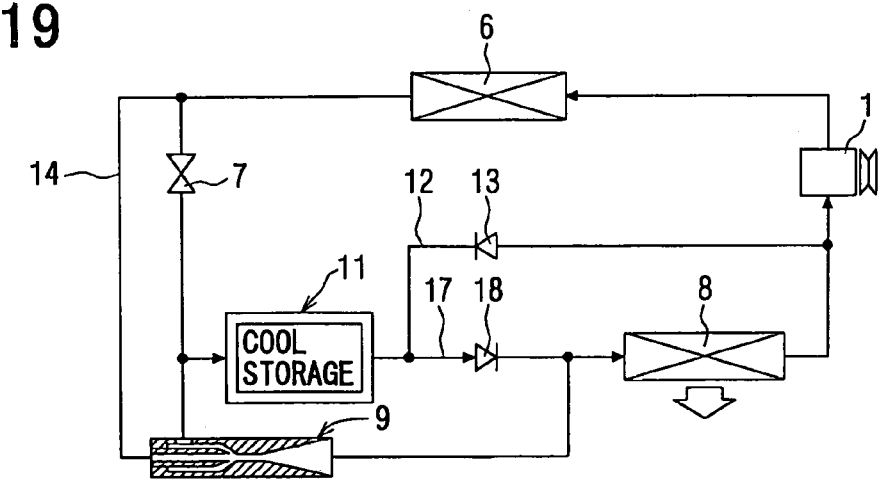
FIG. 19 is a schematic view of a refrigerating cycle of a seventh embodiment showing a normal cooling operation.

As shown in FIG. 19, in the normal cooling operation (and the operation for storing the cooling energy), the refrigerating cycle is operated by the compressor 1, so that the refrigerant flows from and back to the compressor 1 through the condenser device 6, the expansion valve 7, the cool storage heat exchanger 11, the check valve 18 and the evaporator 8.

In this operation, the refrigerant may possibly further flows from the expansion valve 7, the ejector 9 and the evaporator 8. However, since a diameter of the mixing portion 9c of the ejector 9 is much smaller than inner diameters of the refrigerant flow passages in the cool storage heat exchanger 11, a flow amount of the refrigerant flowing through the ejector 9 is negligible small.

Figure 20:
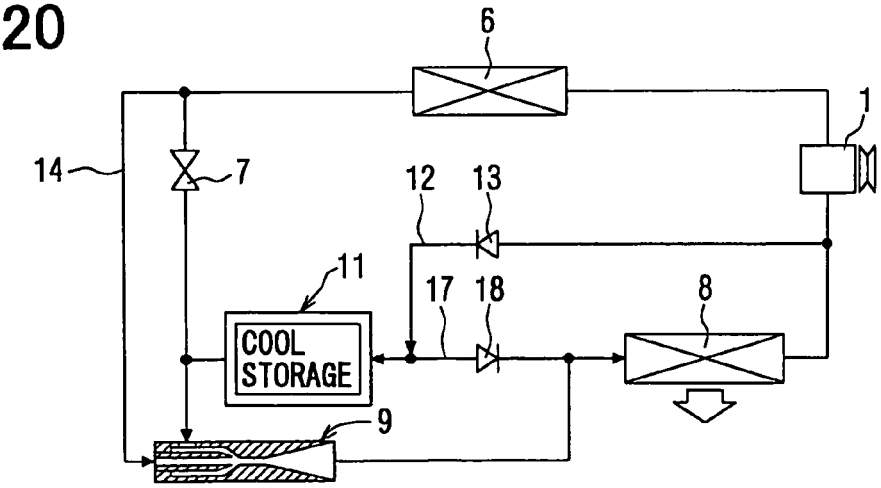
FIG. 20 is also a schematic view of the refrigerating cycle of the seventh embodiment showing a cooling operation with stored cooling energy.

FIG. 20 shows the refrigerating cycle, in which the operation of the compressor 1 is stopped and the cooling operation is continued with the stored cool at the cool storage heat exchanger 11.

The high pressure refrigerant pooled in the condenser device 6 flows to the high pressure inlet port of the ejector 9 through the driving flow passage 14. Then, the ejector 9 sucks the refrigerant from the cool storage heat exchanger 11 and the refrigerant is circulated from and to the cool storage heat exchanger 11 through the ejector 9, the evaporator 8 and the bypass flow passage 12 (the check valve 13). As above, the same effect to the first embodiment can be obtained in the seventh embodiment.

According to the above seventh embodiment, the refrigerating cycle for the normal cooling operation is composed of the compressor 1, the condenser device 6, the expansion valve 7, the cool storage heat exchanger 11, the check valve 18, and the evaporator 8. And another (second) refrigerating cycle for the cooling operation with the stored cooling energy during the compressor operation is stopped is composed of the cool storage heat exchanger 11, the ejector 9 (the suction port and the outlet port), the evaporator 8, and the bypass flow passage 12 including the check valve 13.

Eighth Embodiment

Figure 21:
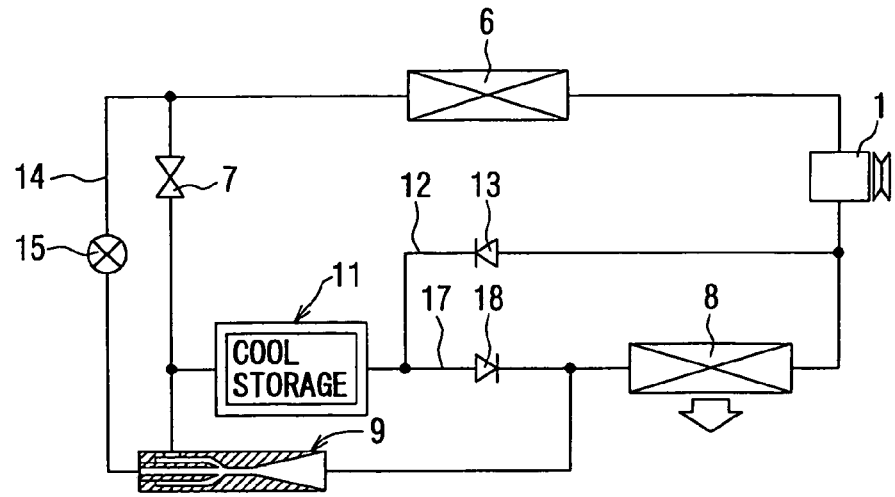
FIG. 21 is a schematic view of a refrigerating cycle of an eighth embodiment.
Figure 22:
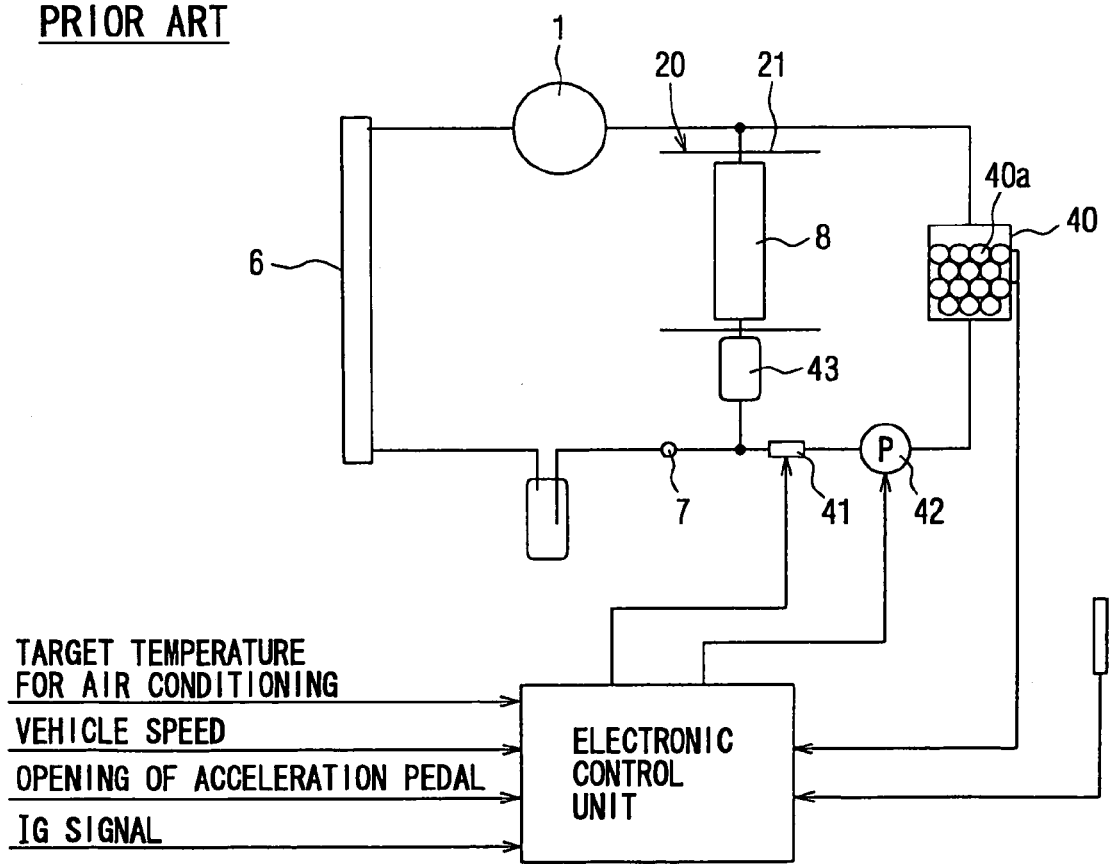
FIGS. 22 to 25 are schematic views respectively showing a prior art air conditioning system and refrigerating cycle.
Figure 23:
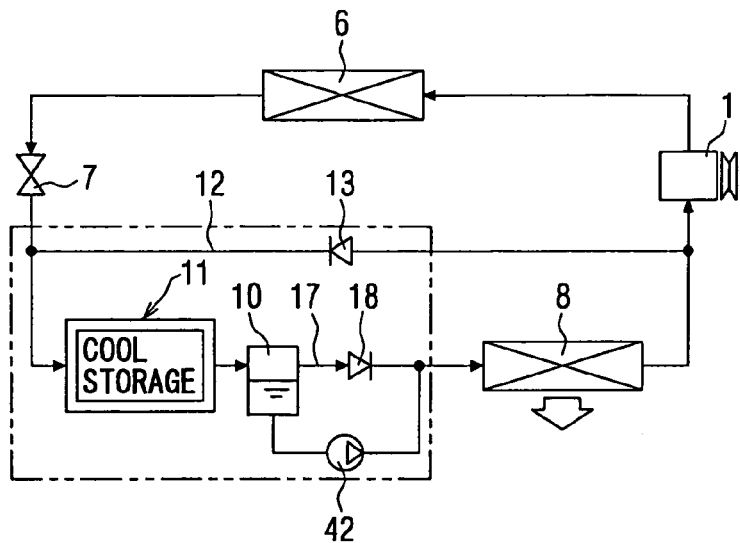
Figure 24:
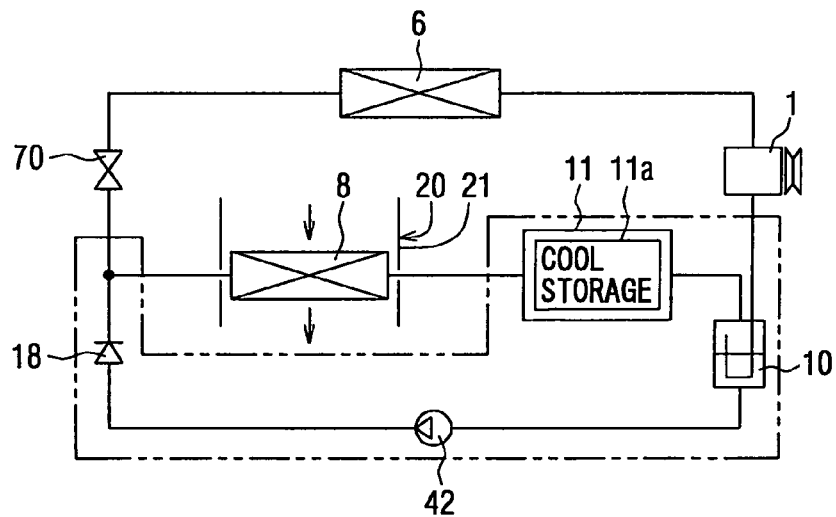

FIG. 21 shows an eighth embodiment of the present invention, which differs from the above seventh embodiment in that a control valve 15 is provided in the driving flow passage 14 and the control valve 15 is controlled by A/C control unit (not shown in FIG. 21).

The control valve 15 is closed in the normal cooling operation, while it is opened in the cooling operation during the engine and the compressor are stopped. Accordingly, the same operation and effect to the first embodiment can be obtained.

The control valve 15 is opened in the cooling operation during the engine and the compressor are stopped, as described above. The ejector 9 is therefore operated only during the control valve 15 is opened, so that an operation period of the ejector 9 can be reduced in comparison with the seventh embodiment (FIGS. 19 & 20). As a result, since the performance degradation of the ejector 9 by its wear can be suppressed, a material having a high wear and abrasion resistance is not necessary for the ejector 9 to thereby make the manufacturing cost lower.

What is claimed is:

1. An air conditioning system for a vehicle, an internal combustion engine of which is temporarily stopped, comprising:
   a compressor driven by the engine;
   a condenser device for heat radiating and condensing refrigerant pumped out from the compressor;
   a depressurizing means for depressurizing the refrigerant discharged from the condenser device;
   an evaporator operatively connected to the depressurizing means for evaporating the depressurized refrigerant and thereby cooling air to be blown into a passenger room of the vehicle;
   a cool storage heat exchanger provided at an upstream side of the evaporator and having cool storage material which will be cooled down by the depressurized refrigerant during the compressor is operated; and
   an electronic control unit for controlling the operation of the above components,
   wherein the air conditioning system further comprises:
   a bypass passage connected between an inlet side of the compressor and a downstream side of the depressurizing means and having a check valve for flowing the refrigerant from the inlet side of the compressor to the downstream side of the depressurizing means;
   a driving flow passage branching off from an upstream side of the depressurizing means and having a control valve for opening and closing the driving flow passage;
   an ejector having a high pressure inlet port connected to the driving flow passage and a suction port connected to the cool storage heat exchanger, in which a nozzle of the ejector converts pressure energy of the high pressure refrigerant from the driving flow passage into speed energy by depressurizing and expanding the refrigerant, the ejector sucks the refrigerant from the cool storage heat exchanger by jet flow of the refrigerant ejected from the nozzle and having a high flow velocity, and a pressure increasing portion of the ejector mixes the ejected refrigerant with the sucked refrigerant and converts the speed energy into the pressure energy to increase the pressure of the refrigerant to be supplied to the evaporator,
   wherein the electronic control unit controls the control valve to open the driving flow passage and to start the operation of the ejector, when the operation of the compressor is stopped due to the temporal operational stop of the engine.

2. An air conditioning system for a vehicle, an internal combustion engine of which is temporarily stopped, comprising:
   a compressor driven by the engine;
   a condenser device for heat radiating and condensing refrigerant pumped out from the compressor;
   a depressurizing means for depressurizing the refrigerant discharged from the condenser device;
   an evaporator operatively connected to the depressurizing means for evaporating the depressurized refrigerant and thereby cooling air to be blown into a passenger room of the vehicle;
   a cool storage heat exchanger provided at an upstream side of the evaporator and having cool storage material which will be cooled down by the depressurized refrigerant during the compressor is operated; and
   an electronic control unit for controlling the operation of the above components, wherein the air conditioning system further comprises:
a driving flow passage branching off from an upstream side of the depressurizing means and having a control valve for opening and closing the driving flow passage;
a suction flow passage branching off from an inlet side of the compressor;
an ejector having a high pressure inlet port connected to the driving flow passage and a suction port connected to the suction flow passage, in which a nozzle of the ejector converts pressure energy of the high-pressure refrigerant from the driving flow passage into speed energy by depressurizing and expanding the refrigerant, the ejector sucks the refrigerant from the suction flow passage by jet flow of the refrigerant ejected from the nozzle and having a high flow velocity, and a pressure increasing portion of the ejector mixes the ejected refrigerant with the sucked refrigerant and converts the speed energy into the pressure energy to increase the pressure of the refrigerant to be supplied to the evaporator,
wherein the electronic control unit controls the control valve to open the driving flow passage and to start the operation of the ejector, when the operation of the compressor is stopped due to the temporal operational stop of the engine.

3. An air conditioning system according to claim 2, wherein
the depressurizing means is composed of a fixed orifice and a gas-liquid separator is provided at the inlet side of the compressor, wherein the suction flow passage branches off from the gas-liquid separator.

4. An air conditioning system for a vehicle, an internal combustion engine of which is temporarily stopped, comprising:
a compressor driven by the engine;
a condenser device for heat radiating and condensing refrigerant pumped out from the compressor;
a depressurizing means for depressurizing the refrigerant discharged from the condenser device;
an evaporator operatively connected to the depressurizing means for evaporating the depressurized refrigerant and thereby cooling air to be blown into a passenger room of the vehicle;
a cool storage heat exchanger provided at a downstream side of the evaporator and having cool storage material which will be cooled down by the depressurized refrigerant during the compressor is operated; and
an electronic control unit for controlling the operation of the above components,
wherein the air conditioning system further comprises:
a driving flow passage branching off from an upstream side of the depressurizing means and having a control valve for opening and closing the driving flow passage;
a suction flow passage branching off from an inlet side of the compressor; and
an ejector having a high pressure inlet port connected to the driving flow passage and a suction port connected to the suction flow passage, in which a nozzle of the ejector converts pressure energy of the high-pressure refrigerant from the driving flow passage into speed energy by depressurizing and expanding the refrigerant, the ejector sucks the refrigerant from the suction flow passage by jet flow of the refrigerant ejected from the nozzle and having a high flow velocity, and a pressure increasing portion of the ejector mixes the ejected refrigerant with the sucked refrigerant and converts the speed energy into the pressure energy to increase the pressure of the refrigerant to be supplied to the evaporator,
wherein the electronic control unit controls the control valve to open the driving flow passage and to start the operation of the ejector, when the operation of the compressor is stopped due to the temporal operational stop of the engine.

5. An air conditioning system according to claim 4, wherein
the depressurizing means is composed of a fixed orifice and a gas-liquid separator is provided at the inlet side of the compressor, wherein the suction flow passage branches off from the gas-liquid separator.

6. An air conditioning system for a vehicle, an internal combustion engine of which is temporarily stopped, comprising:
a compressor driven by the engine;
a condenser device for heat radiating and condensing refrigerant pumped out from the compressor;
a depressurizing means for depressurizing the refrigerant discharged from the condenser device;
an evaporator operatively connected to the depressurizing means for evaporating the depressurized refrigerant and thereby cooling air to be blown into a passenger room of the vehicle;
a cool storage heat exchanger connected in series with the evaporator and having cool storage material which will be cooled down by the depressurized refrigerant during the compressor is operated; and
an electronic control unit for controlling the operation of the above components,
wherein the depressurizing means is composed of a variable orifice controlled by the electronic control unit, and
wherein the air conditioning system further comprises:
a suction flow passage branching off from an inlet side of the compressor; and
an ejector having a high pressure inlet port connected to the depressurizing means and a suction port connected to the suction flow passage, in which a nozzle of the ejector converts pressure energy of the high pressure refrigerant from the depressurizing means into speed energy by depressurizing and expanding the refrigerant, the ejector sucks the refrigerant from the suction flow passage by jet flow of the refrigerant ejected from the nozzle and having a high flow velocity, and a pressure increasing portion of the ejector mixes the ejected refrigerant with the sucked refrigerant and converts the speed energy into the pressure energy to increase the pressure of the refrigerant to be operatively supplied to the evaporator and the cool storage heat exchanger connected in series with the evaporator.

7. An air conditioning system according to claim 6, wherein
a gas-liquid separator is provided at the inlet side of the compressor, wherein the suction flow passage branches off from the gas-liquid separator.

8. An air conditioning system according to claim 7, wherein
the refrigerant from the ejector is supplied to the gas-liquid separator, and
the evaporator and the cool storage heat exchanger are provided in series in the suction flow passage.

9. An air conditioning system for a vehicle, an internal combustion engine of which is temporarily stopped, comprising:

a compressor driven by the engine;

a condenser device for heat radiating and condensing refrigerant pumped out from the compressor;

a depressurizing means for depressurizing the refrigerant discharged from the condenser device;

an evaporator operatively connected to the depressurizing means for evaporating the depressurized refrigerant and thereby cooling air to be blown into a passenger room of the vehicle;

a cool storage heat exchanger having cool storage material which will be cooled down by the depressurized refrigerant during the compressor is operated; and an electronic control unit for controlling the operation of the above components, wherein the depressurizing means is composed of a variable orifice controlled by the electronic control unit, and wherein the air conditioning system further comprises:

a suction flow passage branching off from an inlet side of the compressor, the cool storage heat exchanger being provided in the suction flow passage;

an ejector having a high pressure inlet port connected to the depressurizing means and a suction port connected to the suction flow passage, in which a nozzle of the ejector converts pressure energy of the high pressure refrigerant from the depressurizing means into speed energy by depressurizing and expanding the refrigerant, the ejector sucks the refrigerant from the suction flow passage by jet flow of the refrigerant ejected from the nozzle and having a high flow velocity, and a pressure increasing portion of the ejector mixes the ejected refrigerant with the sucked refrigerant and converts the speed energy into the pressure energy to increase the pressure of the refrigerant to be supplied to the evaporator.

10. An air conditioning system according to claim 9, wherein a gas-liquid separator is provided at the inlet side of the compressor, wherein the suction flow passage branches off from the gas-liquid separator.

11. An air conditioning system for a vehicle, an internal combustion engine of which is temporarily stopped, comprising:

a compressor driven by the engine;

a condenser device for heat radiating and condensing refrigerant pumped out from the compressor;

a depressurizing means for depressurizing the refrigerant discharged from the condenser device;

an evaporator operatively connected to the depressurizing means for evaporating the depressurized refrigerant and thereby cooling air to be blown into a passenger room of the vehicle;

a cool storage heat exchanger provided at an upstream side of the evaporator and having cool storage material which will be cooled down by the depressurized refrigerant during the compressor is operated;

a bypass passage connected between an inlet side of the compressor and a downstream side of the cool storage heat exchanger and having a check valve for flowing the refrigerant from the inlet side of the compressor to the downstream side of the cool storage heat exchanger;

a driving flow passage branching off from an upstream side of the depressurizing means; and an ejector having a high pressure inlet port connected to the driving flow passage and a suction port connected to the cool storage heat exchanger, in which a nozzle of the ejector converts pressure energy of the high-pressure refrigerant from the driving flow passage into speed energy by depressurizing and expanding the refrigerant, the ejector sucks the refrigerant from the cool storage heat exchanger by jet flow of the refrigerant ejected from the nozzle and having a high flow velocity, and a pressure increasing portion of the ejector mixes the ejected refrigerant with the sucked refrigerant and converts the speed energy into the pressure energy to increase the pressure of the refrigerant to be supplied to the evaporator, wherein the ejector is operated by a pressure difference, when the operation of the compressor is stopped due to the temporal operational stop of the engine.

12. An air conditioning system according to claim 11, further comprising:

a control valve provided in the driving flow passage for opening and closing the driving flow passage; and an electronic control unit for controlling the control valve when the operation of the compressor is stopped due to the temporal operational stop of the engine, so that the ejector starts its operation by the pressure difference.

* * * * *